(12) United States Patent
Wong et al.

(10) Patent No.: US 12,356,416 B2
(45) Date of Patent: Jul. 8, 2025

(54) OFDM BASED WIRELESS COMMUNICATION USING FLEXIBLE RESOURCES

(71) Applicant: Sony Group Corporation, Tokyo (JP)

(72) Inventors: Shin Horng Wong, Basingstoke (GB); Kazuyuki Shimezawa, Basingstoke (GB)

(73) Assignee: Sony Group Corporation, Tokyo (JP)

( * ) Notice: Subject to any disclaimer, the term of this patent is extended or adjusted under 35 U.S.C. 154(b) by 477 days.

(21) Appl. No.: 17/632,505

(22) PCT Filed: Jul. 27, 2020

(86) PCT No.: PCT/EP2020/071146
§ 371 (c)(1),
(2) Date: Feb. 3, 2022

(87) PCT Pub. No.: WO2021/028207
PCT Pub. Date: Feb. 18, 2021

(65) Prior Publication Data
US 2022/0287073 A1  Sep. 8, 2022

(30) Foreign Application Priority Data
Aug. 14, 2019 (EP) .................................... 19191863

(51) Int. Cl.
*H04W 72/23* (2023.01)
*H04L 1/08* (2006.01)
(Continued)

(52) U.S. Cl.
CPC ............ *H04W 72/23* (2023.01); *H04L 1/08* (2013.01); *H04W 72/0446* (2013.01); *H04W 72/1268* (2013.01)

(58) Field of Classification Search
CPC ............ H04W 72/14; H04W 72/1268; H04W 72/1893; H04W 72/53; H04L 5/0044; H04L 1/189
See application file for complete search history.

(56) References Cited

U.S. PATENT DOCUMENTS

2019/0230689 A1* 7/2019 Cao .................... H04L 27/2602
2019/0268923 A1* 8/2019 Sundararajan .... H04W 72/1268
(Continued)

FOREIGN PATENT DOCUMENTS

| CN | 109392160 A | 2/2019 |
| CN | 109644461 A | 4/2019 |

(Continued)

OTHER PUBLICATIONS

International Search Report and Written Opinion mailed on Oct. 16, 2020, received for PCT Application PCT/EP2020/071146, Filed on Jul. 27, 2020, 11 pages.

(Continued)

*Primary Examiner* — Derrick W Ferris
*Assistant Examiner* — Won Jun Choi
(74) *Attorney, Agent, or Firm* — XSENSUS, LLP

(57) ABSTRACT

A method of transmitting data by a communications device to a wireless communications network comprising determining, by the communications device, from granted uplink communications resources, OFDM symbols of one or more time slots which are designated for transmitting uplink data, and transmitting the uplink data in the OFDM symbols determined as designated for uplink transmission. The determining the OFDM symbols of the one or more time slots which are designated for transmitting uplink data includes identifying one or more F-symbols of the one or more time (Continued)

slots designated for transmitting the uplink data based on information received with an indication of the communications resources of the uplink.

20 Claims, 12 Drawing Sheets

(51) Int. Cl.
*H04W 72/0446* (2023.01)
*H04W 72/1268* (2023.01)

(56) References Cited

U.S. PATENT DOCUMENTS

| | | | |
|---|---|---|---|
| 2020/0052828 A1* | 2/2020 | Wang | H04L 1/188 |
| 2020/0169377 A1* | 5/2020 | Lee | H04L 5/0051 |
| 2020/0267756 A1* | 8/2020 | Fakoorian | H04L 5/0094 |
| 2021/0168807 A1* | 6/2021 | Jung | H04L 27/00 |
| 2021/0204285 A1* | 7/2021 | Ma | H04L 5/0044 |

FOREIGN PATENT DOCUMENTS

| | | |
|---|---|---|
| CN | 109698738 A | 4/2019 |
| JP | 2020511897 A | 4/2020 |
| TW | 201836288 A | 10/2018 |
| WO | WO-2018174692 A | 9/2018 |
| WO | 2019/035584 A1 | 2/2019 |
| WO | WO-2019028276 A1 | 2/2019 |
| WO | WO-2019062154 A1 | 4/2019 |
| WO | 2019/141685 A1 | 7/2019 |
| WO | 2020/067815 A1 | 4/2020 |

OTHER PUBLICATIONS

3GPP, "Multiplexing and Channel Coding (Release 15)", 3GPP TS 38.212, V15.4.0, Dec. 2018, 101 pages.
3GPP, "Multiplexing and Channel Coding", 3GPP TS 38.212, V15.6.0, Release 15, Jul. 2019, 106 pages.
3GPP, "Physical Layer Procedures for Control (Release 15)", 3GPP TS 38.213, V15.6.0, Jun. 2019, 107 pages.
Sharp, "PUSCH Enhancements for NR URLLC", 3GPP TSG RAN WG1 Meeting #97, R1-1907221, May 13-17, 2019, 9 pages.
Intel Corporation, "On PUSCH Enhancements for eURLLC", 3GPP TSG RAN WG1 RAN1#97, R1-1906808, May 13-17, 2019, 9 pages.
Holma et al., "LTE for UMTS OFDMA and SC-FDMA Based Radio Access", John Wiley & Sons, 2009, 232 pages.
Nokia et al., "Revised SID: Study on NR Industrial Internet of Things (IoT)", 3GPP TSG RAN meeting #81, RP-182090, Sep. 10-13, 2018, 5 pages.
Huawei et al., "New WID: Physical Layer Enhancements for NR Ultra-Reliable and Low Latency Communication (URLLC)", 3GPP TSG RAN Meeting #83, RP-190726, Mar. 18-21, 2019, 5 pages.
Huawei et al., "PDCCH Enhancements for URLLC", 3GPP TSG RAN WG1 Meeting #97, R1-1906057, May 13-17, 2019, 11 pages.
Nokia et al., "On PDCCH Enhancements for NR URLLC", 3GPP TSG RAN WG1#97, R1-1906751, May 13-17, 2019, 17 pages.

* cited by examiner

OFDM BASED WIRELESS COMMUNICATION USING FLEXIBLE RESOURCES

CROSS-REFERENCE TO RELATED APPLICATIONS

The present application is based on PCT/EP2020/071146 filed on Jul. 27, 2020, and claims priority to EP 19191863.0 filed on Aug. 14, 2019, the entire contents of each are incorporated herein by reference.

BACKGROUND

Field

The present disclosure relates to communications devices, infrastructure equipment and methods for the transmitting uplink data by a communications device in a wireless communications network.

Description of Related Art

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly or impliedly admitted as prior art against the present invention.

Third and fourth generation mobile telecommunication systems, such as those based on the 3GPP defined UMTS and Long Term Evolution (LTE) architecture, are able to support more sophisticated services than simple voice and messaging services offered by previous generations of mobile telecommunication systems. For example, with the improved radio interface and enhanced data rates provided by LTE systems, a user is able to enjoy high data rate applications such as mobile video streaming and mobile video conferencing that would previously only have been available via a fixed line data connection. The demand to deploy such networks is therefore strong and the coverage area of these networks, i.e. geographic locations where access to the networks is possible, may be expected to increase ever more rapidly.

Future wireless communications networks will be expected to support communications routinely and efficiently with a wider range of devices associated with a wider range of data traffic profiles and types than current systems are optimised to support. For example it is expected future wireless communications networks will be expected to efficiently support communications with devices including reduced complexity devices, machine type communication (MTC) devices, high resolution video displays, virtual reality headsets and so on. Some of these different types of devices may be deployed in very large numbers, for example low complexity devices for supporting the "The Internet of Things", and may typically be associated with the transmissions of relatively small amounts of data with relatively high latency tolerance.

In view of this there is expected to be a desire for future wireless communications networks, for example those which may be referred to as 5G or new radio (NR) system/new radio access technology (RAT) systems [1], as well as future iterations/releases of existing systems, to efficiently support connectivity for a wide range of devices associated with different applications and different characteristic data traffic profiles.

An example of such a new service is referred to as Ultra Reliable Low Latency Communications (URLLC) services which, as its name suggests, requires that a data unit or packet be communicated with a high reliability and with a low communications delay. URLLC type services therefore represent a challenging example for both LTE type communications systems and 5G/NR communications systems.

The increasing use of different types of communications devices associated with different traffic profiles can give rise to new challenges for efficiently handling communications in wireless telecommunications systems particularly when aspects introduced for flexibility make satisfying new service requirements more difficult.

SUMMARY

The present disclosure can help address or mitigate at least some of the issues discussed above.

Embodiments of the present technique can provide a method of transmitting data by a communications device to a wireless communications network comprising receiving by the communications device an indication of uplink communications resources in one or more time-slots of a wireless access interface for transmitting the uplink data. The uplink communications resources may be either provided by dynamic grant of resources such as by a downlink control information message or a configured grant in which radio resource configuration signalling is used to configure the uplink resources including both time and frequency. The time-slots each include communications resources comprising a plurality of Orthogonal Frequency Division Multiplexing, OFDM, symbols, which are designated as either uplink symbols for the communications device to transmit uplink data, downlink symbols in which an infrastructure equipment can transmit signals and the communications device cannot transmit the uplink data or flexible symbols which can be configured as either uplink symbols or downlink symbols. The one or more flexible symbols (F-symbols) can be configured by a slot format indicator received by the communications device. The method comprises determining, by the communications device, from the indicated uplink communications resources, OFDM symbols of the one or more time slots which are designated for transmitting the uplink data, and transmitting the uplink data in the OFDM symbols determined as designated for uplink transmission. The determining the OFDM symbols of the one or more time slots which are designated for transmitting uplink data includes identifying one or more of the F-symbols of the one or more time slots as designated for transmitting the uplink data based on information received in the indication of the uplink communications resources for transmitting the uplink data.

In order to provide flexibility in the use of communications resources a time division duplex wireless access interface which is time divided into a plurality of time-slots each comprising a plurality of OFDM symbols, the OFDM symbols can be configured to include OFDM symbols designated for uplink transmission (UL-symbols), OFDM symbols designated for downlink transmission (DL-symbols) and OFDM symbols which are flexible (F-symbols) which can be configured to be designated for either uplink transmission or downlink transmission. The time slots may be configured, for example, using radio resource configuration signalling. Having established the configuration of the time slots with UL-symbols, DL-symbols and F-symbols, the F-symbols can be dynamically configured as either UL-symbols or DL-symbols using, for example, a slot format indicator, which is transmitted to the communications device by a serving infrastructure equipment of the wireless communications network. However the slot format indicator may not be reliably received by the communications device, which can result in the communications device transmitting uplink data in F-symbols which are used for downlink transmission thereby causing interference with the transmission of the uplink data. Embodiments of the present technique can provide an explicit or implicit indication of the slot format in a downlink control information message which grant uplink communications resources of the wireless access interface for the communications device to transmit the uplink data. Since there can be a greater likelihood of receiving the downlink control information message correctly or a configured grant correctly, a likelihood of transmitting the uplink data in OFDM symbols designated for uplink transmission, which are UL-symbols and F-symbols designated for uplink transmission, then there is a reduced likelihood of interference.

Respective aspects and features of the present disclosure are defined in the appended claims.

It is to be understood that both the foregoing general description and the following detailed description are exemplary, but are not restrictive, of the present technology. The described embodiments, together with further advantages, will be best understood by reference to the following detailed description taken in conjunction with the accompanying drawings.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings wherein like reference numerals designate identical or corresponding parts throughout the several views, and.

DETAILED DESCRIPTION OF THE EMBODIMENTS

Long Term Evolution Advanced Radio Access Technology (4G)

Figure 1:
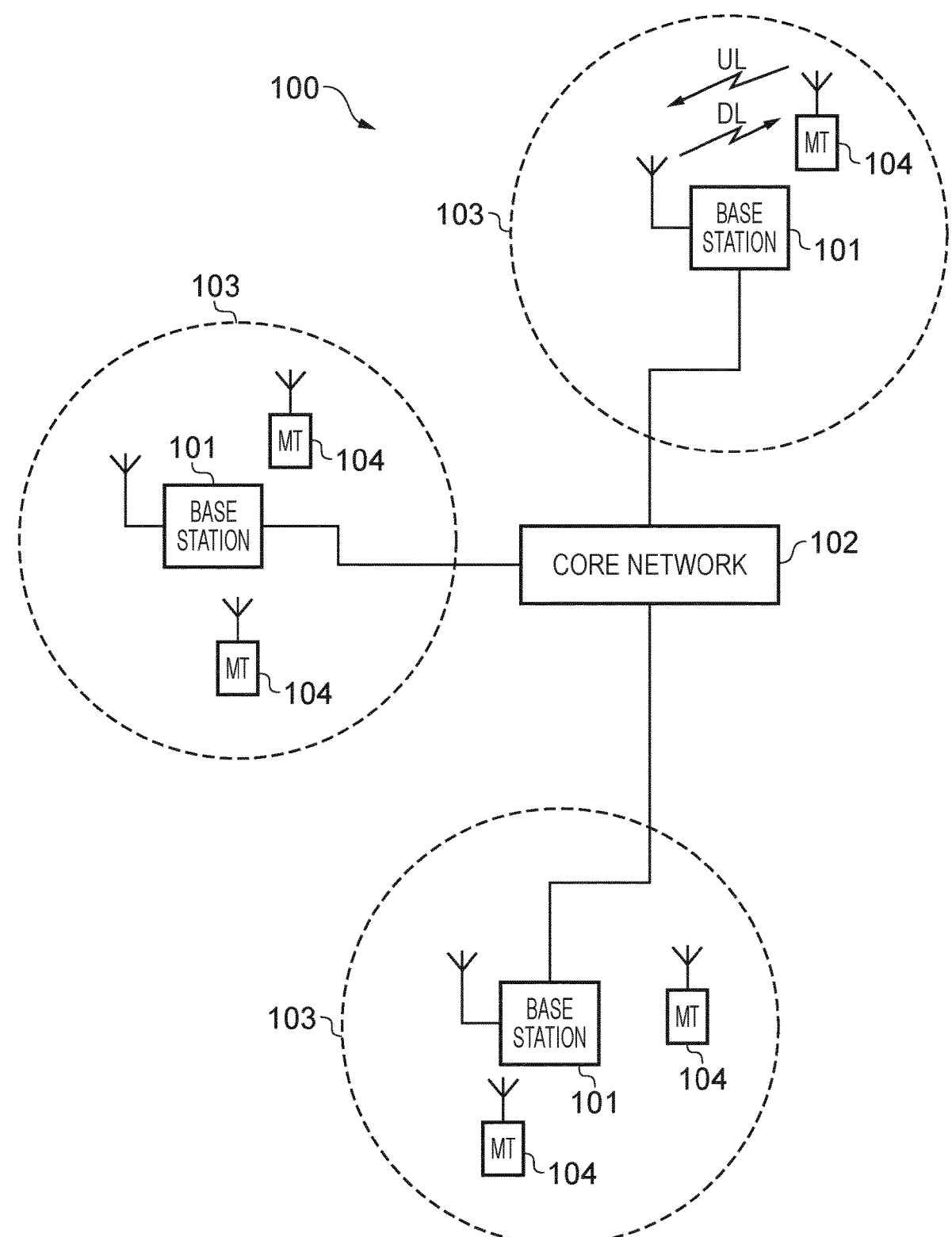
FIG. 1 schematically represents some aspects of an LTE-type wireless telecommunication system which may be configured to operate in accordance with certain embodiments of the present disclosure.

FIG. 1 provides a schematic diagram illustrating some basic functionality of a mobile telecommunications network/system 100 operating generally in accordance with LTE principles, but which may also support other radio access technologies, and which may be adapted to implement embodiments of the disclosure as described herein. Various elements of FIG. 1 and certain aspects of their respective modes of operation are well-known and defined in the relevant standards administered by the 3GPP (RTM) body, and also described in many books on the subject, for example, Holma H. and Toskala A [2]. It will be appreciated that operational aspects of the telecommunications networks discussed herein which are not specifically described (for example in relation to specific communication protocols and physical channels for communicating between different elements) may be implemented in accordance with any known techniques, for example according to the relevant standards and known proposed modifications and additions to the relevant standards.

The network 100 includes a plurality of base stations 101 connected to a core network part 102. Each base station provides a coverage area 103 (e.g. a cell) within which data can be communicated to and from communications devices 104. Data is transmitted from the base stations 101 to the communications devices 104 within their respective coverage areas 103 via a radio downlink Data is transmitted from the communications devices 104 to the base stations 101 via a radio uplink. The core network part 102 routes data to and from the communications devices 104 via the respective base stations 101 and provides functions such as authentication, mobility management, charging and so on. Communications devices may also be referred to as mobile stations, user equipment (UE), user terminals, mobile radios, terminal devices, and so forth. Base stations, which are an example of network infrastructure equipment/network access nodes, may also be referred to as transceiver stations/nodeBs/e-nodeBs, g-nodeBs (gNB) and so forth. In this regard different terminology is often associated with different generations of wireless telecommunications systems for elements providing broadly comparable functionality. However, example embodiments of the disclosure may be equally implemented in different generations of wireless telecommunications systems such as 5G or new radio as explained below, and for simplicity certain terminology may be used regardless of the underlying network architecture. That is to say, the use of a specific term in relation to certain example implementations is not intended to indicate these implementations are limited to a certain generation of network that may be most associated with that particular terminology.

New Radio Access Technology (5G)

Figure 2:
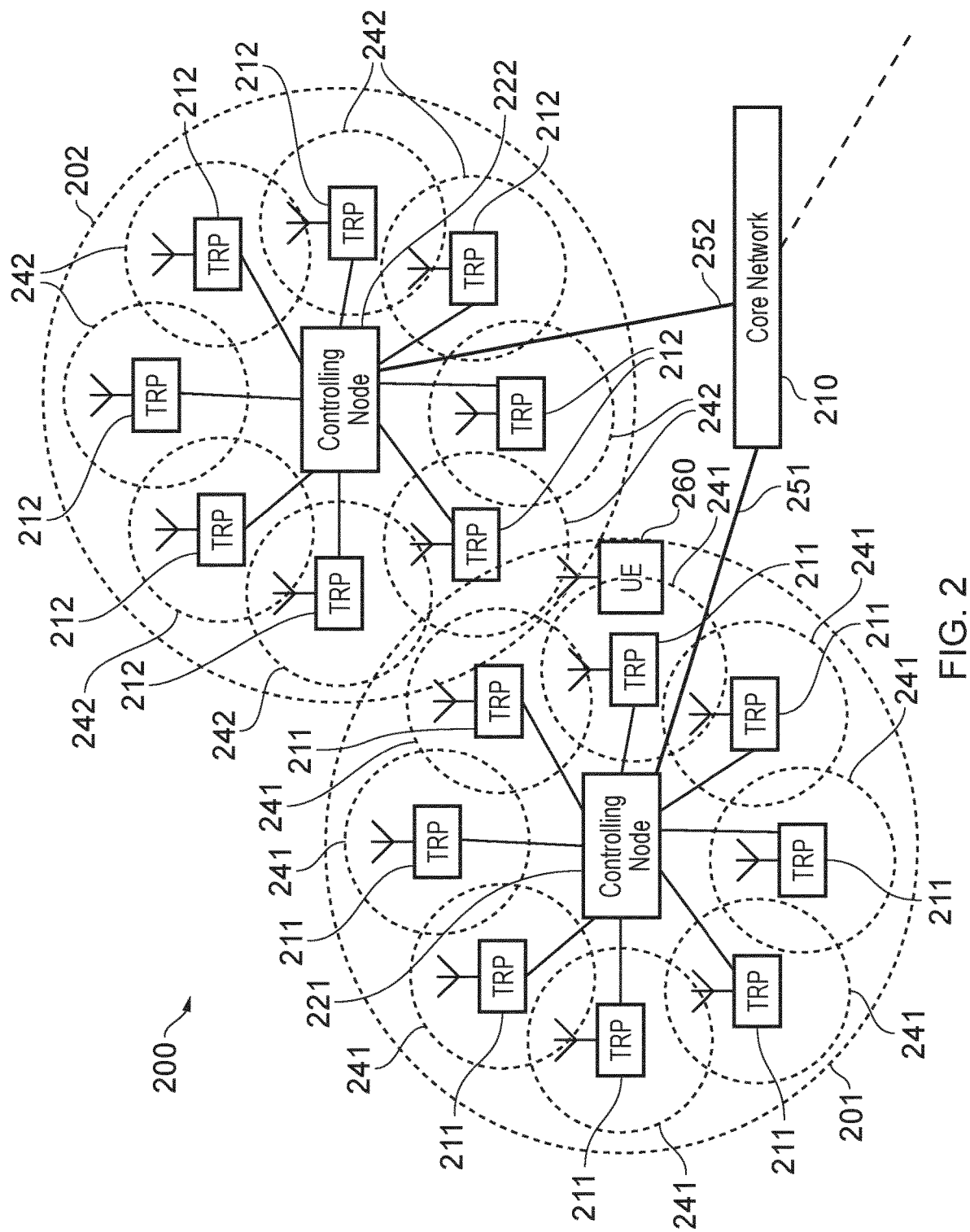
FIG. 2 schematically represents some aspects of a new radio access technology (RAT) wireless telecommunications system which may be configured to operate in accordance with certain embodiments of the present disclosure.

FIG. 2 is a schematic diagram illustrating a network architecture for an NR wireless communications network/system 200 based on previously proposed approaches which may also be adapted to provide functionality in accordance with embodiments of the disclosure described herein. The NR network 200 represented in FIG. 2 comprises a first communication cell 201 and a second communication cell 202. Each communication cell 201, 202, comprises a controlling node (centralised unit) 221, 222 in communication with a core network component 210 over a respective wired or wireless link 251, 252. The respective controlling nodes 221, 222 are also each in communication with a plurality of distributed units (radio access nodes/remote transmission and reception points (TRPs)) 211, 212 in their respective cells. Again, these communications may be over respective wired or wireless links. The distributed units 211, 212 are responsible for providing the radio access interface for communications devices connected to the network. Each distributed unit 211, 212 has a coverage area (radio access footprint) 241, 242 where the sum of the coverage areas of the distributed units under the control of a controlling node together define the coverage of the respective communication cells 201, 202. Each distributed unit 211, 212 includes transceiver circuitry for transmission and reception of wireless signals and processor circuitry configured to control the respective distributed units 211, 212.

In terms of broad top-level functionality, the core network component 210 of the NR communications network represented in FIG. 2 may be broadly considered to correspond with the core network 102 represented in FIG. 1, and the respective controlling nodes 221, 222 and their associated distributed units/TRPs 211, 212 may be broadly considered to provide functionality corresponding to the base stations 101 of FIG. 1. The term network infrastructure equipment/access node may be used to encompass these elements and more conventional base station type elements of wireless communications systems. Depending on the application at hand the responsibility for scheduling transmissions which are scheduled on the radio interface between the respective distributed units and the communications devices may lie with the controlling node/centralised unit and/or the distributed units/TRPs.

A communications device or UE 260 is represented in FIG. 2 within the coverage area of the first communication cell 201. This communications device 260 may thus exchange signalling with the first controlling node 221 in the first communication cell via one of the distributed units 211 associated with the first communication cell 201. In some cases communications for a given communications device are routed through only one of the distributed units, but it will be appreciated in some other implementations communications associated with a given communications device may be routed through more than one distributed unit, for example in a soft handover scenario and other scenarios.

In the example of FIG. 2, two communication cells 201, 202 and one communications device 260 are shown for simplicity, but it will of course be appreciated that in practice the system may comprise a larger number of communication cells (each supported by a respective controlling node and plurality of distributed units) serving a larger number of communications devices.

It will further be appreciated that FIG. 2 represents merely one example of a proposed architecture for a NR communications system in which approaches in accordance with the principles described herein may be adopted, and the functionality disclosed herein may also be applied in respect of wireless communications systems having different architectures.

Thus example embodiments of the disclosure as discussed herein may be implemented in wireless telecommunication systems/networks according to various different architectures, such as the example architectures shown in FIGS. 1 and 2. It will thus be appreciated the specific wireless communications architecture in any given implementation is not of primary significance to the principles described herein. In this regard, example embodiments of the disclosure may be described generally in the context of communications between network infrastructure equipment/access nodes and a communications device, wherein the specific nature of the network infrastructure equipment/access node and the communications device will depend on the network infrastructure for the implementation at hand. For example, in some scenarios the network infrastructure equipment/access node may comprise a base station, such as an LTE-type base station 101 as shown in FIG. 1 which is adapted to provide functionality in accordance with the principles described herein, and in other examples the network infrastructure equipment/access node may comprise a control unit/controlling node 221, 222 and/or a TRP 211, 212 of the kind shown in FIG. 2 which is adapted to provide functionality in accordance with the principles described herein.

Figure 3:
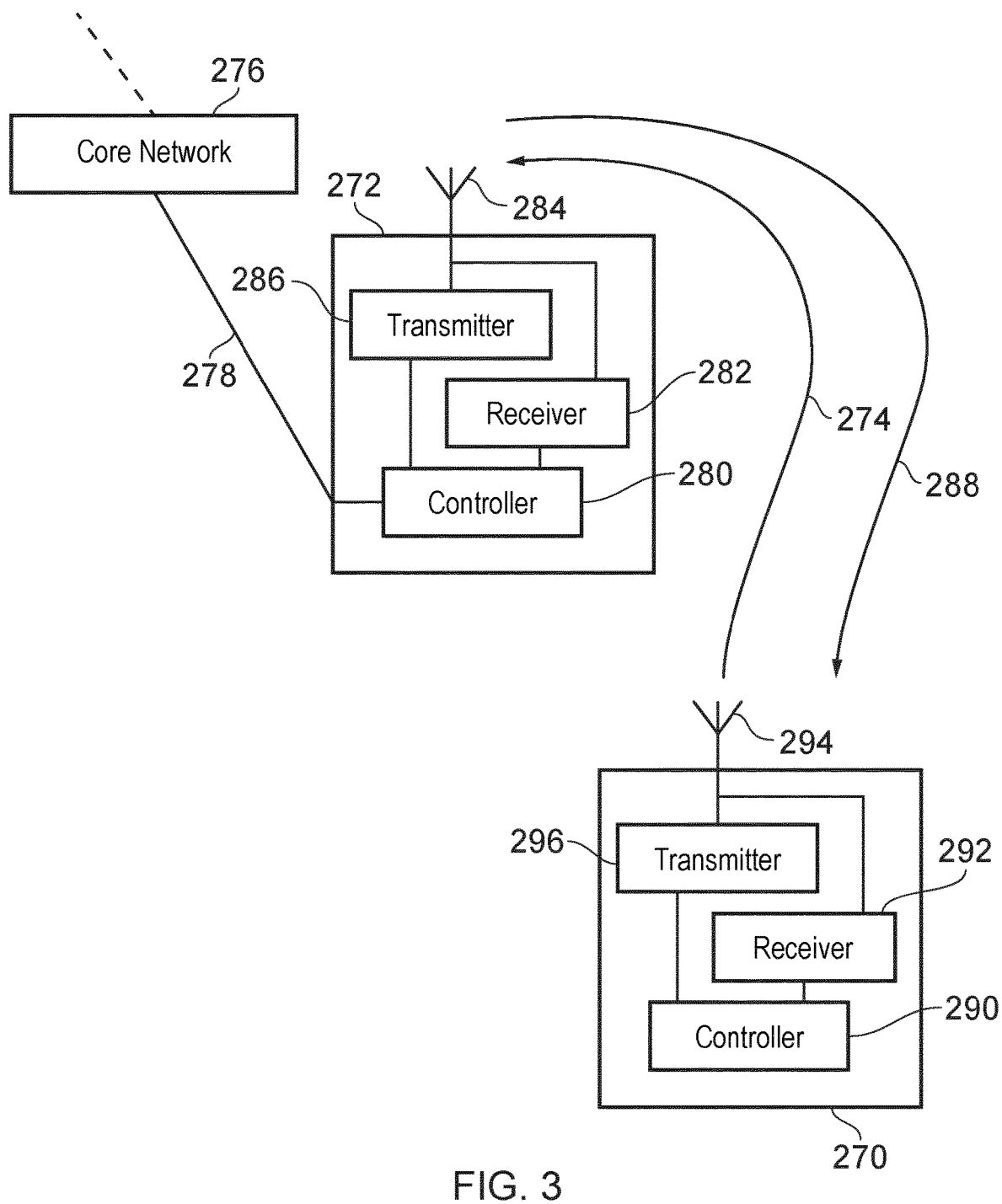
FIG. 3 is a schematic block diagram of an example infrastructure equipment and communications device which may be configured in accordance with example embodiments.

A more detailed illustration of a UE 270 and an example network infrastructure equipment 272, which may be thought of as a gNB 101 or a combination of a controlling node 221 and TRP 211, is presented in FIG. 3. As shown in FIG. 3, the UE 270 is shown to transmit uplink data to the infrastructure equipment 272 via resources of a wireless access interface as illustrated generally by an arrow 274. The UE 270 may similarly be configured to receive downlink data transmitted by the infrastructure equipment 272 via resources of the wireless access interface as illustrated by the arrow 288. As with FIGS. 1 and 2, the infrastructure equipment 272 is connected to a core network 276 via an interface 278 to a controller 280 of the infrastructure equipment 272. The infrastructure equipment 272 includes a receiver 282 connected to an antenna 284 and a transmitter 286 connected to the antenna 284. Correspondingly, the UE 270 includes a controller 290 connected to a receiver 292 which receives signals from an antenna 294 and a transmitter 296 also connected to the antenna 294.

The controller 280 is configured to control the infrastructure equipment 272 and may comprise processor circuitry which may in turn comprise various sub-units/sub-circuits for providing functionality as explained further herein. These sub-units may be implemented as discrete hardware elements or as appropriately configured functions of the processor circuitry. Thus the controller 280 may comprise circuitry which is suitably configured/programmed to provide the desired functionality using conventional programming/configuration techniques for equipment in wireless telecommunications systems. The transmitter 286 and the receiver 282 may comprise signal processing and radio frequency filters, amplifiers and circuitry in accordance with conventional arrangements. The transmitter 286, the receiver 282 and the controller 280 are schematically shown in FIG. 3 as separate elements for ease of representation. However, it will be appreciated that the functionality of these elements can be provided in various different ways, for example using one or more suitably programmed programmable computer(s), or one or more suitably configured application-specific integrated circuit(s)/circuitry/chip(s)/chipset(s). As will be appreciated the infrastructure equipment 272 will in general comprise various other elements associated with its operating functionality.

Correspondingly, the controller 290 of the UE 270 is configured to control the transmitter 296 and the receiver 292 and may comprise processor circuitry which may in turn comprise various sub-units/sub-circuits for providing functionality as explained further herein. These sub-units may be implemented as discrete hardware elements or as appropriately configured functions of the processor circuitry. Thus the controller 290 may comprise circuitry which is suitably configured/programmed to provide the desired functionality using conventional programming/configuration techniques for equipment in wireless telecommunications systems. Likewise, the transmitter 296 and the receiver 292 may comprise signal processing and radio frequency filters, amplifiers and circuitry in accordance with conventional arrangements. The transmitter 296, receiver 292 and controller 290 are schematically shown in FIG. 3 as separate elements for ease of representation. However, it will be appreciated that the functionality of these elements can be provided in various different ways, for example using one or more suitably programmed programmable computer(s), or one or more suitably configured application-specific integrated circuit(s)/circuitry/chip(s)/chipset(s). As will be appreciated the communications device 270 will in general comprise various other elements associated with its operating functionality, for example a power source, user interface, and so forth, but these are not shown in FIG. 3 in the interests of simplicity.

The controllers 280, 290 may be configured to carry out instructions which are stored on a computer readable medium, such as a non-volatile memory. The processing steps described herein may be carried out by, for example, a microprocessor in conjunction with a random access memory, operating according to instructions stored on a computer readable medium.

5G, URLLC and Industrial Internet of Things

Systems incorporating NR technology are expected to support different services (or types of services), which may be characterised by different requirements for latency, data rate and/or reliability. For example, Enhanced Mobile Broadband (eMBB) services are characterised by high capacity with a requirement to support up to 20 Gb/s. The requirements for Ultra Reliable & Low Latency Communications (URLLC) services are for a reliability of $1\text{-}10^{-5}$ (99.999%) or higher for one transmission of a 32 byte packet with a user plane latency of 1 ms [5]. In some scenarios, there may be a requirement for a reliability of $1\text{-}10^{-6}$ (99.9999%) or higher with either 0.5 ms or 1 ms of user plane latency. Massive Machine Type Communications (mMTC) is another example of a service which may be supported by NR-based communications networks.

In addition, systems may be expected to support further enhancements related to Industrial Internet of Things (IIoT) in order to support services with new requirements of high availability, high reliability, low latency, and in some cases, high-accuracy positioning.

Industrial automation, energy power distribution and intelligent transport systems are examples of new use cases for Industrial Internet of Things (IIoT). In an example of industrial automation, the system may involve different distributed components working together. These components may include sensors, virtualized hardware controllers and autonomous robots, which may be capable of initiating actions or reacting to critical events occurring within a factory and communicating over a local area network.

The UEs in the network may therefore be expected to handle a mixture of different traffic, for example, associated with different applications and potentially different quality of service requirements (such as maximum latency, reliability, packet sizes, throughput). Some messages for transmission may be time sensitive and be associated with strict deadlines and the communications network may therefore be required to provide time sensitive networking (TSN) [6].

URLLC services are required in order to meet the requirements for IIoT, which require high availability, high reliability, low latency, and in some cases, high-accuracy positioning [1]. Some IIoT services may be implemented by using a mixture of eMBB and URLLC techniques, where some data is transmitted by eMBB and other data is transmitted by URLLC.

Improvements in or Relating to Uplink Communication Using Dynamically Granted or Configured Grant Embodiments of the present technique can provide a UE which is configured to transmit uplink data to a wireless communications network via a wireless access interface comprising a plurality of time-slots each including communications resources comprising a plurality of OFDM symbols designated as either uplink symbols for the communications device to transmit uplink data (UL-symbols), downlink symbols in which an infrastructure equipment can transmit signals and the communications device cannot transmit the uplink data (DL-symbols) or flexible symbols which can be indicated by a different information including a slot format indicator (SFI) as either designated as UL-symbols or DL-symbols or remain as F-symbols. The UE is configured to transmit the uplink data in one or more of the time-slots of the wireless access interface for transmitting the uplink data, determining from the granted communications resources, OFDM symbols of the one or more time slots which are designated for transmitting the uplink data, and transmitting the uplink data in the OFDM symbols determined as designated for uplink transmission. The UE determines the OFDM symbols of the one or more time slots which are designated for transmitting uplink data by identifying one or more of the F-symbols of the one or more time slots designated for transmitting the uplink data based on information received in the downlink control information message granting the communications resources and the characteristic of the uplink resources.

Embodiments of the present technique described below provide a more efficient arrangement for utilising communications resources caused by a requirement to transmit uplink data as soon as possible via an uplink resource of the wireless access interface. A better appreciation provided by the example embodiments can be gained from reviewing a proposed wireless access interface according to 3GPP LTE and NR. However it will be appreciated that the wireless access interface provides physical communications resources including shared channels for both uplink and the downlink which may be accessed by communicating appropriate control signalling as those acquainted with LTE will appreciate. Equally a wireless access interface for the 5G Standard as represented in FIG. 2 may be similarly formed and may use OFDM on the downlink and OFDM or SC-FDMA on the uplink.

A configured grant is a grant of uplink resources that are semi-statically configured (using RRC signalling) for PUSCH transmission by a UE. This can avoid the UE having to send a Scheduling Request (SR) and wait for an uplink grantrant in a downlink contro, information (DCI) message in order to transmit its PUSCH thereby significantly reducing latency. In contrast, a dynamic uplink grant provides a resource allocation for a PUSCH dynamically by a downlink control information (DCI) message, such as time resources such as duration of the PUSCH, frequency resources such as number physical resource blocks, modulation & coding scheme (MCS), etc.

According to the above explanation the OFDM symbols of the time-slots of the wireless access interface can be semi-statically configured as either UL-symbols, DL-symbols or F-symbols. The F-symbols can then be dynamically configured by other indications which can be implicit or explicit. If the UE uses configured grant to transmit uplink data in the time-slots which may comprise UL-symbols and F-symbols, the UE can determine that the F-symbols are either implicitly or explicitly identified as being for use as uplink PUSCH resources. In other words, the UE can determine which of the one or more F-symbols of the granted communications (radio) resources are to be used as UL-symbols, based on the characteristic of the configured grant.

As will be appreciated from this explanation, the time-slots of the wireless access interface can be semi-statically configured with one or more F-symbol using RRC signalling. Dynamic signalling such as using a slot format indicator (SFI) or an UL/DL grant can then be used further to configure the F-symbols as either UL or DL. A semi-statically configured DL symbol cannot be dynamically configured as UL or F-symbol by an SFI. According to the example embodiments only the F-symbols can be changed to UL or DL-symbols by an SFI (or DCI grant). A (dynamic) uplink grant can schedule a PUSCH to transmit on UL-symbols that are either semi-statically configured by RRC or dynamically configured by SFI (i.e. F-symbols dynamically indicated as UL symbols) and F-symbols that are not changed by the SFI. According to the example embodiments uplink grant of resources using RRC configured F-symbols as UL symbols presents a challenge since F-symbols configured using an SFI may or may not be converted to UL symbols, because there may be some reliability with communicating the SFI.

According to current proposals, a format of the time slots of the wireless access interface can be configured using RRC signalling for configuring the slot format in respect of the use of the OFDM symbols as UL-symbols, DL-symbols and F-symbols. Separate and different RRC configuration can be used to provide a grant of the resources of the uplink using these time slots, which is referred to as a configured grant. Thus configured grant configuration and slot format configuration are separate RRC configurations, as defined for example in TS 38.331. For this case:

1) There is one RRC configuration for uplink configured grant where the network configures resource allocations such as frequency and time resources for a PUSCH;
2) Then there is another RRC configuration which configures only designation of the OFDM symbols of the slot format for example the DL, UL, and F-symbols.

A specification for the wireless access interface (e.g. 3GPP specifications) can then define the UE's behaviour in respect of these two RRC configurations. As will be appreciated from the described embodiments, and as mentioned above use of a slot format indicator (SFI) alone can introduce a vulnerability in respect possible errors in receiving the SFI.

Figure 4:
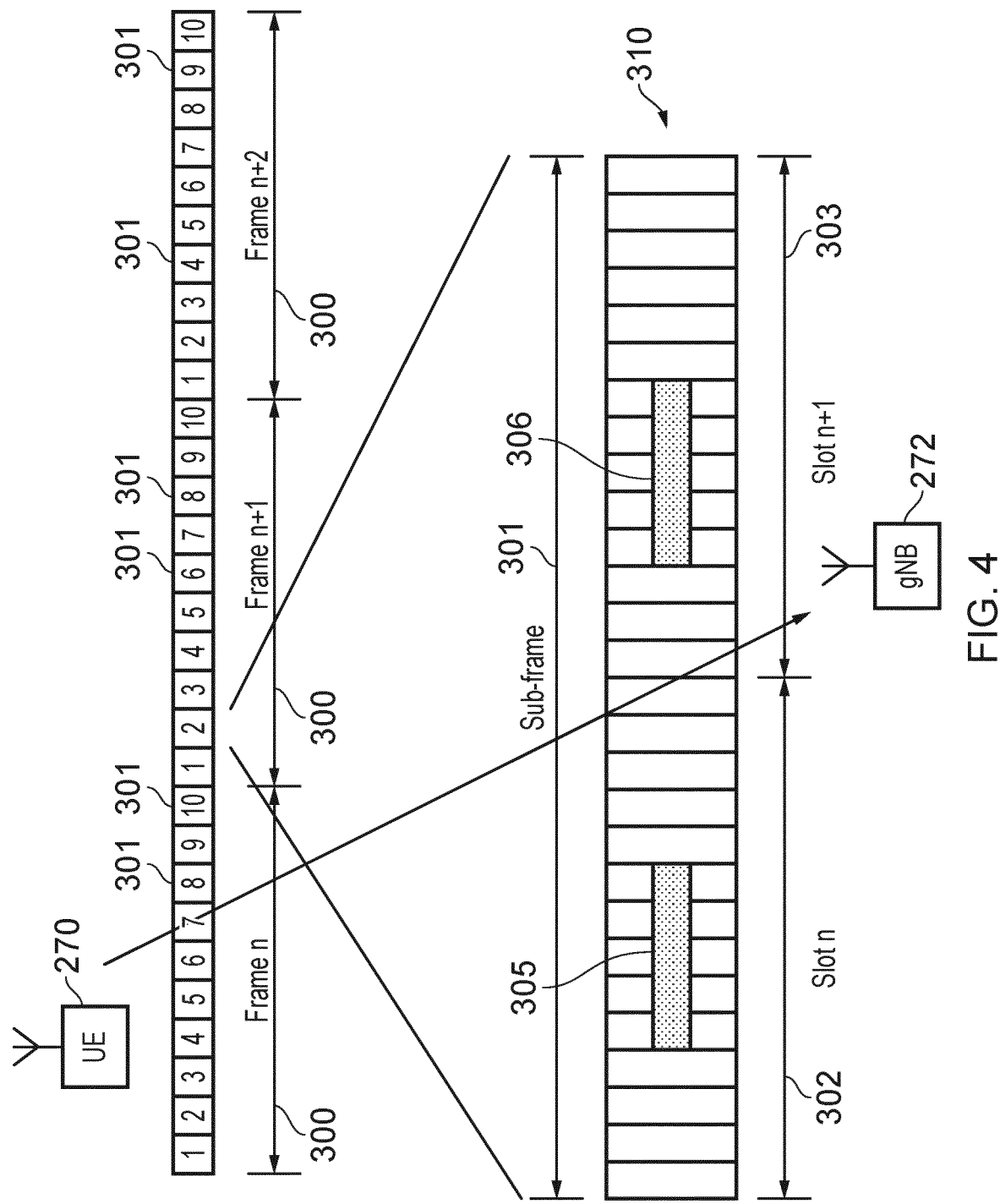
FIG. 4 is a schematic representation of a frame, sub-frame and time-slot structure providing a simplified representation of a wireless access interface for new radio technology.

FIG. 4 provides a simplified representation of an uplink structure with time divided units which may be used for the NR wireless access interface structure. Whilst the terms "frames" and "sub-frames" used in FIG. 4 are terms which have been used in LTE, 3GPP standards adopted for NR may be different and so it will be appreciated that FIG. 4 is provided for illustration only to assist in the explanation of the example embodiments. For NR, one slot provides a time divided structure of the wireless access interface consists of fourteen OFDM symbols, and one sub-frame is defined by 1 ms. As such, the time divided structure of the wireless access interface of FIG. 4 shows an example in case of 30 kHz carrier spacing, so that one sub-frame has two slots and twenty eight symbols. As shown in FIG. 4, the uplink of the wireless access interface is shown to comprise frames 300 with respect to which the UE 270 transmits uplink data to the infrastructure equipment 272. The uplink comprises in each frame 300 ten sub-frames 301. A frame 300 is defined by 10 ms, a sub-frame 301 is defined by 1 ms, and a slot 302, 303 is defined by fourteen OFDM symbols, irrespective of subcarrier spacing. In FIG. 4, 30 kHz subcarrier spacing is assumed. An expanded view of the components of a sub-frame 301 are shown to be formed from two consecutive slots n, n+1 302, 303 include physical resources of a shared channel as well as control channels.

In 5G/NR, communications resources for both uplink and downlink communications are allocated by the infrastructure equipment, and may be signalled to the communications device in downlink control information (DCI), transmitted using a physical downlink control channel (PDCCH). As shown in FIG. 4, a UE 270 may be allocated by a DCI resource of the physical uplink shared channel (PUSCH) comprising a plurality of contiguous OFDM symbols 305, 306 out of the number of OFDM symbols in each slot 302, 303 and frequencies which may be repeated in consecutive time slots 305, 306. The duration of a PUSCH allocation 305, 306 can be 1 to 14 OFDM symbols where a duration of less than 14 symbols (1 slot) is informally termed as sub-slot PUSCH or mini-slot PUSCH. A mini-slot PUSCH can start at any symbol in a slot provided that the PUSCH transmission does not cross slot boundary.

Figure 5:
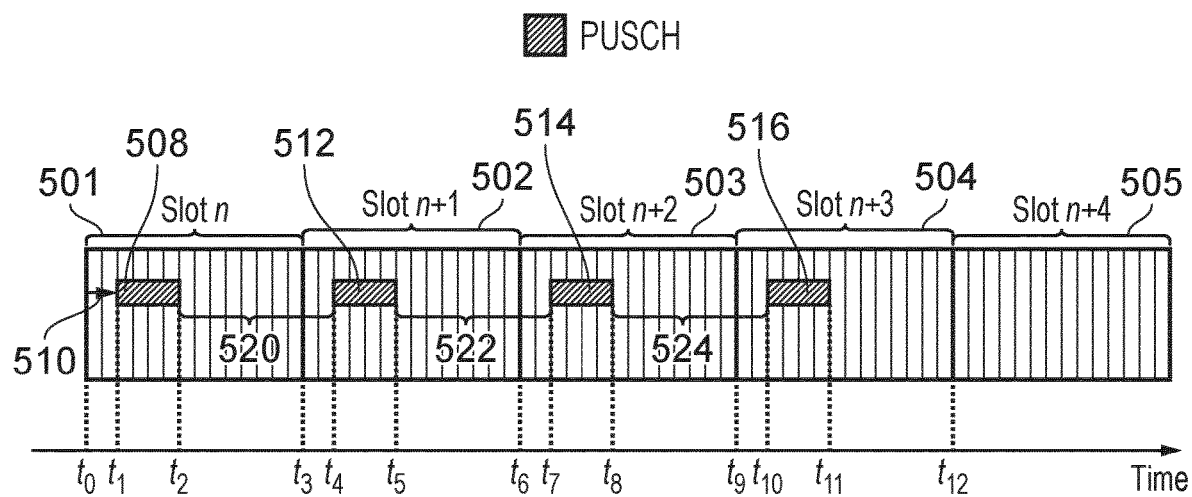
FIG. 5 is a schematic representation of a plurality of time slots each comprising fourteen OFDM symbols illustrating an example transmission of uplink data using repetition in a plurality of the time-slots.

In previous 3GPP standards such Release-15, slot based PUSCH repetition was introduced to improve a reliability of the PUSCH transmission. An example is shown in FIG. 5, which provides a representation of time slots 501, 502, 503, 504, 505 corresponding to the time slots 302, 303 shown in FIG. 4, where a mini-slot PUSCH of four symbols duration 508 which starts with a two symbol offset from the slot boundary (represented by an arrow 510) is repeated four times 512, 514, 516 using slot based repetition starting from slot n 501 to slot n+3 504. The number of slot based PUSCH repetitions is RRC configured.

Figure 6:
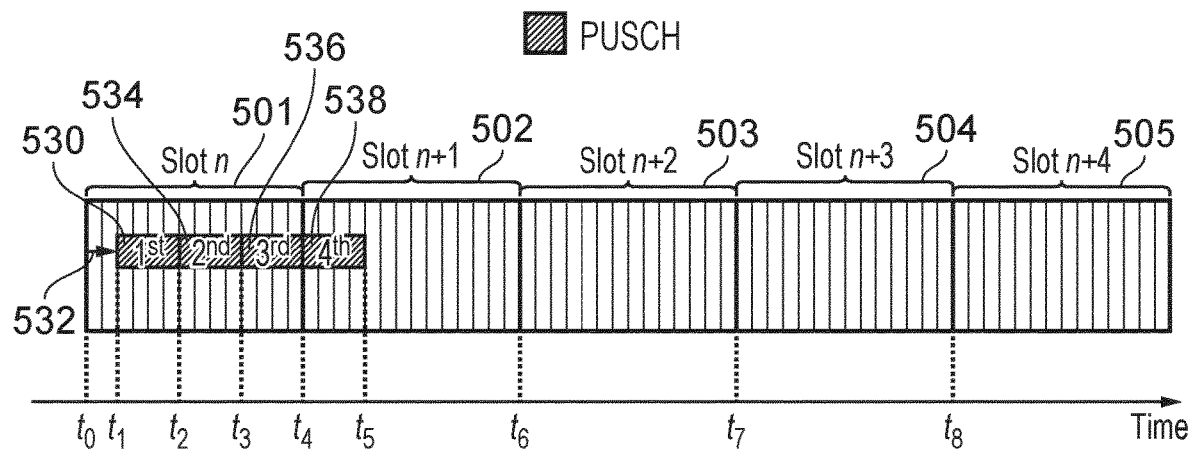
FIG. 6 is a schematic representation of a plurality of time slots corresponding to those shown in FIG. 5 illustrating an example transmission of uplink data using repetition in mini-slots.

In the slot based PUSCH repetition, where the PUSCH duration is less than a slot, time gaps between repetitions are observed. For the example in FIG. 5, the PUSCH is repeated at the slot level leaving a gap of 10 symbols 520, 522, 524 between repetition samples. Such gaps introduce latency which may not comply with the requirements for URLLC. Recognising this created latency, in the 3GPP standard for Release-16 under the Work Item eURLLC, mini-slot PUSCH repetition was introduced in which the PUSCH repetition is repeated back-to-back forming a contiguous/continuous section of communications resources thereby minimising latency whilst improving reliability. An example is shown in FIG. 6, in which a four symbol duration PUSCH 530 with two symbols offset from the slot boundary 532, is repeated four times using mini-slot repetition 534, 536, 538. Here there are no gaps between each repetition thereby completing the entire repetitions within sixteen symbols compared to fifty six symbols (four slots) in the slot based repetition of the same PUSCH shown in FIG. 4. It is expected that a single DCI will schedule these four PUSCH mini-slot repetitions 530, 534, 536, 538.

Figure 7:
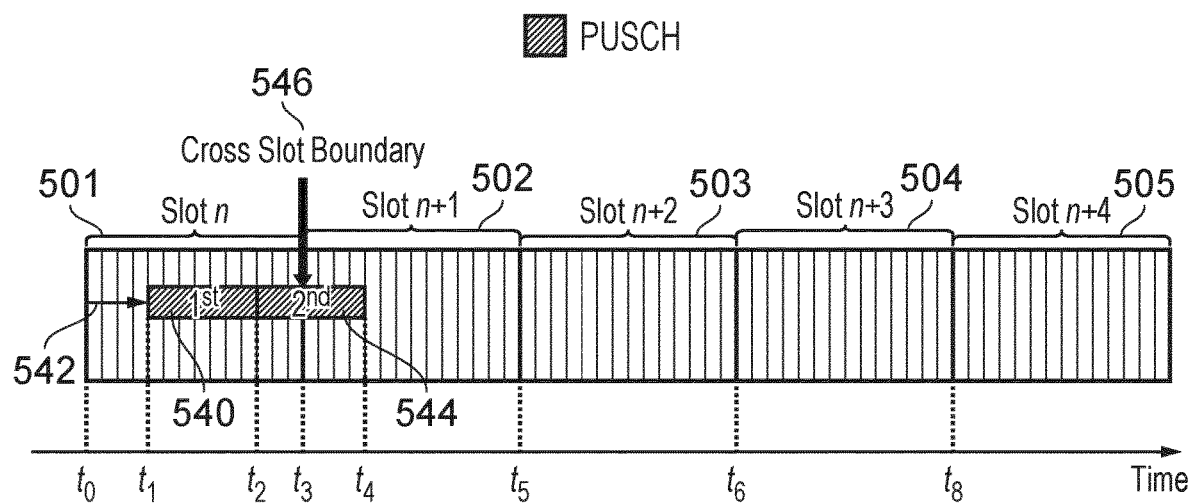
FIG. 7 is a schematic representation of a plurality of time slots corresponding to those shown in FIG. 5 illustrating an example transmission of uplink data using repetition in which one of the repetitions of the transmitted uplink data crosses a boundary between two time slots.

In 3GPP Release-15, a PUSCH transmission is contained within a slot, that is, a PUSCH transmission does not cross slot boundary. However, in a mini-slot repetition, it is possible for one of the repetitions to cross slot boundary depending on the start of the first repetition and the duration of the repetition. For example consider a seven symbol PUSCH 540 that is repeated twice times as shown in FIG. 7, where the first PUSCH repetition 540 starts at time $t_1$ which is four symbols offset from the slot boundary 542 of slot n 501. The second PUSCH 544 starting after the end of the first PUSCH 540 at time $t_2$ results in the transmission of the data crossing the slot boundary 546 (between slot n and n+1, 501, 502) at time $t_3$. Crossing of the slot boundary has a significant impact on the specification not only on the physical layer but also on the higher layers.

Figure 8:
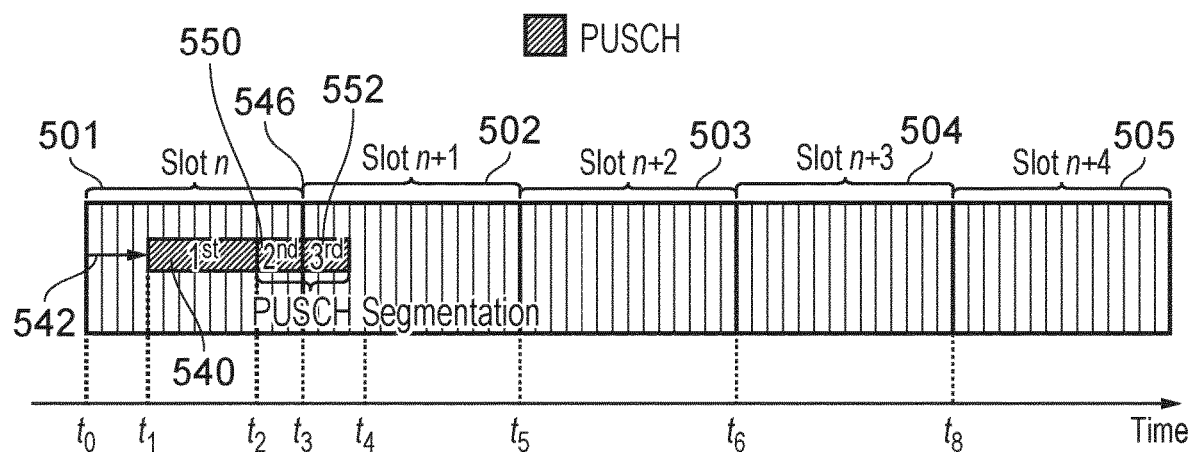
FIG. 8 is a schematic representation of a plurality of time slots of the diagram of FIG. 7 illustrating an example transmission of uplink data in which one of the repetitions of the transmitted uplink data is segmented in order to avoid a boundary between two time slots.

In order to avoid transmitting uplink data a PUSCH which crosses a slot boundary 546, PUSCH segmentation was introduced, where a PUSCH transmission which crosses a slot boundary is segmented into two segments. This effectively increases the number of repetition in a transmission where some of the repetitive samples have a different duration. Using the example in FIG. 7, the second PUSCH repetition 544, can be segmented into two segments 550, 552 as shown in FIG. 8, where the first segment 550 between time $t_2$ and $t_3$ (labelled "$2^{nd}$") is on one side of the slot boundary 546 (i.e. in slot n 501) and the second segment 552 between time $t_3$ and $t_4$ (labeled as "$3^{rd}$") is on the other side of the slot boundary 546 (i.e. in slot n+1 502).

Figure 9:
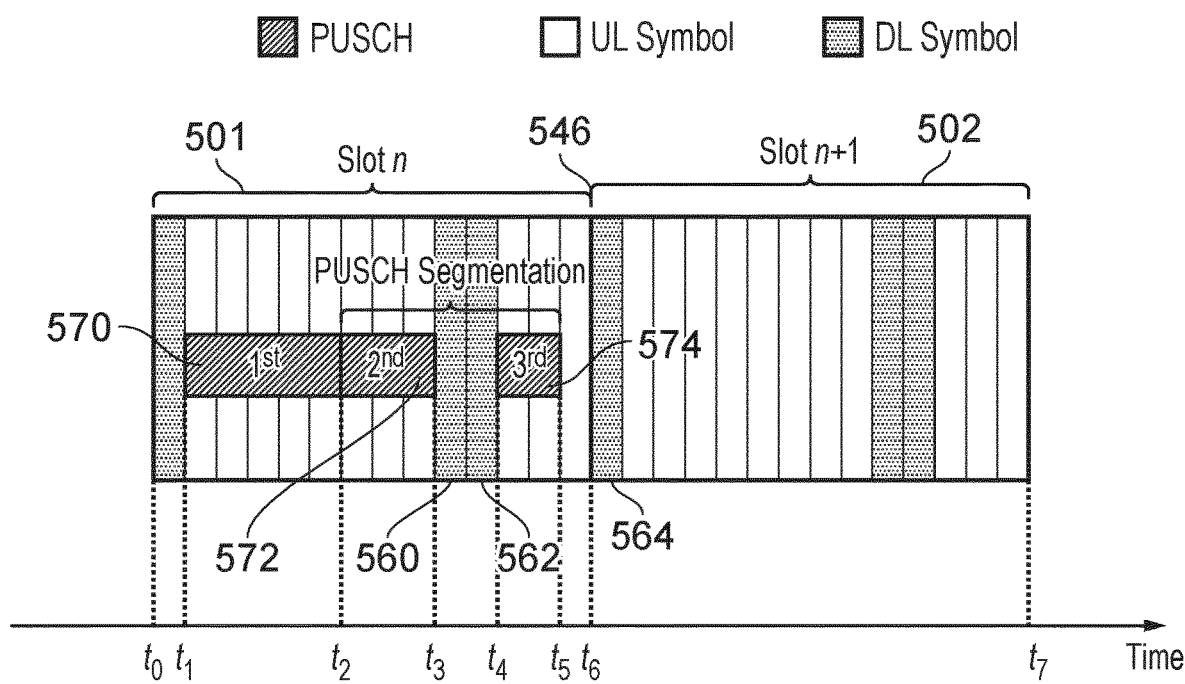
FIG. 9 is a schematic representation of two time slots corresponding to those shown in FIG. 5 illustrating an example transmission of uplink data using repetition in which one of the repetitions of the transmitted uplink data is segmented to prevent transmission of the uplink data in OFDM symbols designated for downlink transmissions.

In addition to a PUSCH repetition crossing the slot boundary 546, a PUSCH repetition can also be segmented if it is interrupted by a Downlink symbol in a TDD operation. An example is shown in FIG. 9, in which in slot n 501, the $1^{st}$, $10^{th}$ and $11^{th}$ symbols 560, 563, 564 are configured for downlink transmission and the rest of the OFDM symbols are for uplink transmission. As a result, a five symbol PUSCH duration 570 with two times repetition is transmitted at time $t_1$. The second repetition crosses the OFDM symbols allocated for downlink transmission 560, 562 between time $t_3$ and $t_4$ and hence transmission is split into two segments 572, 574 giving a second repetition of three symbols duration 572 and a third repetition of two symbols duration 574.

Slot Format Indicator (SFI)

In order to provide greater flexibility in scheduling and to ensure efficient use of the communication resources it has been proposed that flexibility may be provided in terms of which the OFDM symbols of a time slot are configured for uplink transmission and for downlink time transmission. At least for TDD operation, the slot format, i.e. the pattern of the OFDM symbols in a slot can be configured semi-statically (RRC configured) to be Downlink (DL), Uplink (UL) or Flexible (F-symbol). The F-symbol can be further dynamically configured using SFI (Slot Format Indicator) to be DL or UL or remain as Flexible. The SFI is included in a Group Common DCI (Format 2_0 [6]) that is signalled to multiple UEs to indicate the slot format of one or more slots. There can potentially be 255 possible slot formats i.e. combination of DL-symbol, UL-symbol and F-symbol in a slot, which are listed in a lookup table in Section 11.1.1 of T538.213 [7] (only 56 slot formats are defined in Rel-15 and the remaining entries are reserved for future releases). The SFI is RRC configured with Slot Format Combination which is a subset of the 255 possible slot formats, that is, the network selects a subset of slot formats that can be dynamically indicated in the SFI. Each Slot Format in the Slot Format Combination is assigned a Slot Format Combination ID and the SFI signals this Slot Format Combination ID to the group of UEs. If the F-symbols are not indicated as UL-symbols or DL-symbols by the SFI, the UL Grant or the DL Grant would implicitly assign them as UL-symbols or DL-symbols if the scheduled PUSCH or PDSCH occupies these F-symbols. However, as mentioned above, the UL grant cannot use an F-symbol that has been indicated as DL-symbol for PUSCH by the SFI and similarly the DL grant cannot use an F-symbol that has been indicated as UL-symbol by the SFI for PDSCH. That is, the UL grant and DL grant in the DCI cannot overwrite an F-symbol that has been indicated as either UL-symbol or DL-symbol by the SFI. Similarly the SFI cannot overwrite a semi-statically configured UL-symbol or DL-symbol. That is to say only an F-symbol that has not been indicated by the SFI as UL-symbol or DL-symbol can be used by UL grant for PUSCH and DL grant for PDSCH. Similarly only semi-statically (i.e. RRC) configured F-symbol can be indicated as UL-symbol or DL-symbol by the SFI. An SFI indication can last for one or more time slots, after which the subsequent time-slots revert back to what has been configured by the RRC. So if the SFI indication last for two slots, then an F-symbol that is indicated as UL will then revert back to F-symbol after these two slots.

Figure 10:
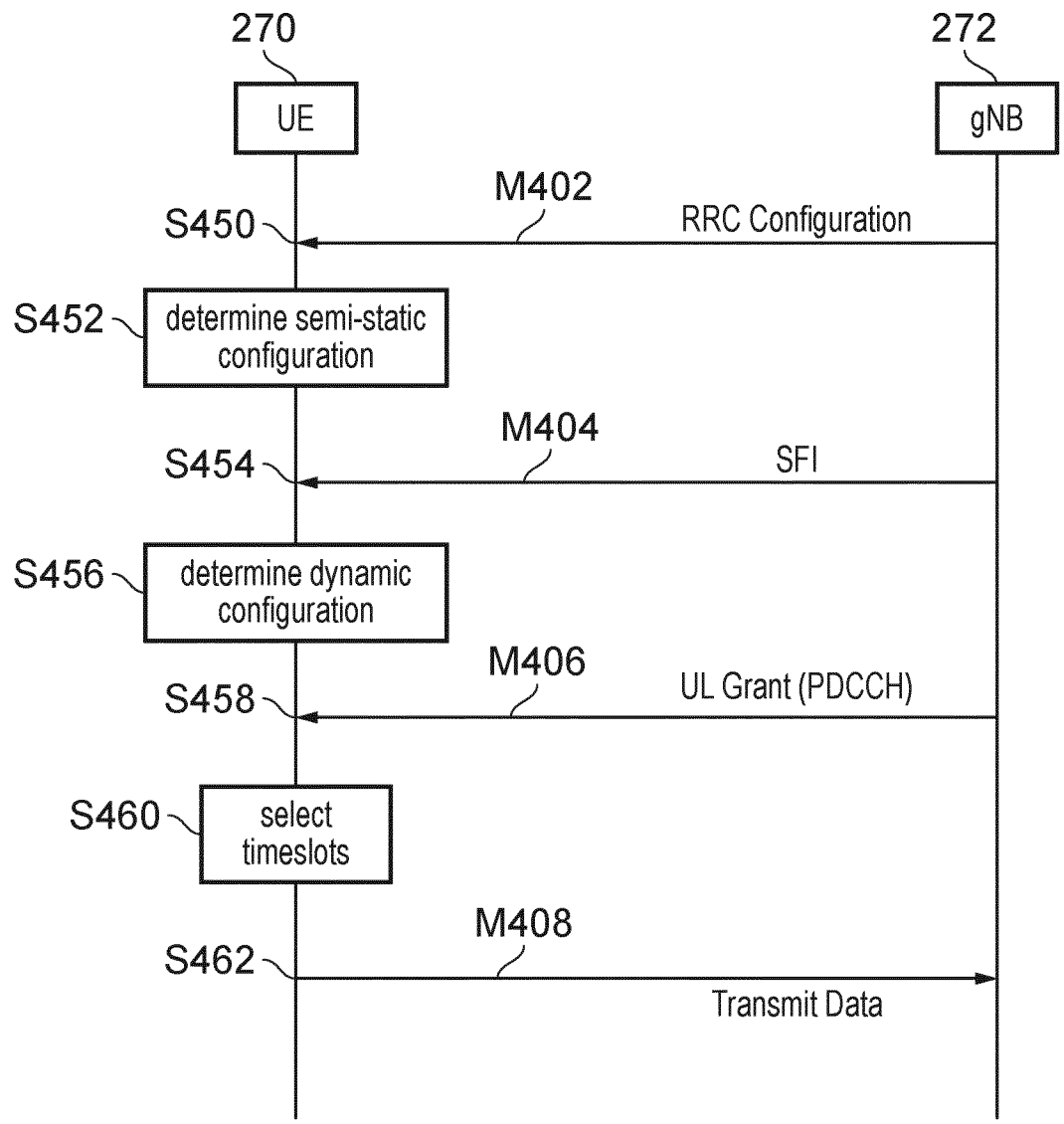
FIG. 10 is a message flow diagram illustrating a message exchange between a communications device and an infrastructure equipment when transmitting uplink data in accordance with embodiments of the present disclosure.

FIG. 10 illustrates a message sequence chart based on current proposals for configuring communication resources in a time division multiplexed wireless access interface for the transmission of data by a communications device such as the communications device 270 of FIG. 3. In the sequence of FIG. 10, the process starts with the transmission of a Radio Resource Configuration (RRC) message M402 at step S450. The RRC message M402 comprises an indication for a plurality of timeslots, indicating for each timeslot whether that timeslot is semi-statically configured as an uplink timeslot, whether that timeslot is semi-statically configured for as a downlink timeslot, or semi-statically configured as an F-symbol, i.e. a symbol that is not semi-statically configured as either uplink or downlink Semi-statically configured uplink timeslot & downlink timeslot are therefore designation of an OFDM symbols which remain until there is a RRC signalled change in the configuration.

At step S452, the communications device 270 accordingly determines the semi-static configuration of the OFDM symbols of the time slot in accordance with the RRC message M402. Subsequently at step S454, the infrastructure equipment 272 transmits a slot format indication (SFI) M404 to the communications device. The SFI may be transmitted using a group common DCI which is transmitted to multiple communications devices simultaneously. Accordingly there is no need to transmit the SFI 404 to each individual communications devices. The SFI comprises an indication of a dynamic configuration of flexible OFDM symbols, i.e. F-symbol, as either uplink or downlink OFDM symbols in respect of a determined set of consecutive symbols.

It has been agreed that all indications transmitted to a communications device which indicate whether a timeslot is for uplink or downlink communication shall be consistent and thus the SFI 404 can only change those OFDM symbols which are indicated as being flexible F-symbols in the RRC Configuration message M402. This can be achieved by an SFI, which indicates an index to a look up table. That lookup table gives the slot pattern for all symbols in a slot. Effectively it also indicates the symbols that are RRC configured as DL-symbols and as UL-symbols. The SFI indication must be consistent with the RRC configuration. So if the first symbol is RRC configured to be a DL-symbols and the second symbol as F-symbol, then the only indication that the SFI is:

1) First symbol is a DL-symbol, the second symbol is a DL-symbol;
2) First symbol is a DL-symbol, the second symbol is an UL-symbol;
3) First symbol is a DL-symbol, the second symbol is an F-symbol;

That is SFI cannot change the first symbol but due to the way in which the SFI points to an index to a slot pattern lookup table, the SFI must point to a slot pattern where the first symbol is always a DL-symbol. Otherwise if the SFI points to a slot pattern in which the first symbol is an UL-symbol, then there would be an error. In other words, a UE does not expect to be indicated by the SFI that the first symbol is an UL-symbol.

Based on the SFI M404, at step S456, the communications device 270 determines whether each OFDM symbol of a timeslot is configured for uplink transmission or a downlink transmission. Subsequently at step S458, the infrastructure equipment 272 transmits uplink grant information M406 to the communications device 270. The uplink grant indication M406 comprises an indication of communication resources for the transmission of data by the communications device 270 to the infrastructure equipment 272. However for efficiency, the uplink grant does not explicitly indicate each OFDM symbol to be used for the uplink transmission of data. Rather, the uplink grant indication M406 may indicate for example a start time and a number of uplink allocated timeslots. For example, the uplink grant M406 may indicate that the communications device 270 is to transmit uplink data using five OFDM symbols 570 starting at time $t_1$ indicated in FIG. 9. It will be appreciated that based on the RRC Configuration message M402, the SFI M404 and the uplink grant indication M406 that the communications device is able to determine which timeslots it is allocated for the uplink transmission of data. Specifically, the communications device 270 is allocated the five OFDM symbols starting at time $t_1$, which are available and configured as uplink timeslots. As explained above, the allocation of the second PUSCH transmission by the uplink grant M406 and the presence of the DL-symbols 560, 562 for the example of FIG. 9, causes segmentation of the PUSCH transmission into the second and third segments 572, 574.

As mentioned above, although 3GPP has defined three ways to configure the slot format, i.e. by RRC, by SFI and by UL or DL grant, the UE is not expected to be given contradictory slot formats. That is if RRC configures a symbol to be UL, the SFI will not indicate that symbol to be DL. Similarly if SFI indicates a symbol to be UL, the DL grant will not assign a PDSCH to occupy that symbol.

It is recognised in 3GPP that the PDCCH carrying the SFI may not have the same reliability as a PDCCH carrying an UL grant or DL grant for a URLLC UE. Increasing the reliability of the SFI is not efficient since the SFI is also targeted for eMBB UEs that does not require ultra-high reliability and also a lot of resources are required to ensure all UEs in the cell (i.e. cell edge UEs) meet the reliability requirement for URLLC. Hence, a URLLC UE may not reliably determine from the SFI whether an F-symbol is configured as DL or UL and therefore it may not reliably segment its PUSCH repetition. There are some proposals to ignore the SFI for example in a recent discussion it is suggested that F-symbols are assumed to be UL symbols for URLLC UEs and it is the gNB's scheduler responsibility to ensure that these F-symbols are allocated for UL. In other proposal, it is suggested that the PUSCH repetition is dropped if it collides with an F-symbol [6], which reduces the reliability of the PUSCH transmission since the targeted repetition is not reached. It is also argued that ignoring the SFI reduces the flexibility of the gNB scheduler thereby defeating the purpose of the F-symbol [9]. Hence, a technical problem is identified on how to support the flexibility of the SFI for URLLC UE and also efficiently provide the high reliability required by URLLC.

As will be appreciated from the above explanation, it has been recognised that in order to improve the reliability of the uplink data transmission, without significantly increasing the latency of the transmission, it is preferable to repeat, pre-emptively, the transmission of the data. In particular, according to some proposals, it is suggested to repeat the transmissions without (as far as possible) any intervening time periods between successive repetitions. However, in the context of time division multiplexed communications resources repeated transmission of data requires many more time periods (e.g. OFDM symbols) than a single transmission, and this therefore requires that a larger number of consecutive OFDM symbols are configured as uplink OFDM symbols. Where this is not possible, the repetitions may be separated (i.e. not contiguous in time) or may be segmented (so that a given repetition is either truncated or otherwise confined to be transmitted in fewer OFDM symbols than one or more other repetitions.) Generally, however, it is understood that repetitions may be organised to take account of OFDM symbols which are configured as downlink timeslots.

A further problem that has been identified is that the SFI transmission M404 may not be reliably received by all communications device in a cell. Accordingly, a communications device may not be able to determine whether a given resource which is semi-statically configured as a 'flexible' resource, is in fact available for uplink transmission.

Embodiments of the present technique have therefore been devised in order to improve a reliability in communicating a format of a time slot so that a UE can transmit uplink data in communications resources of a wireless access interface without the transmission being interfered with by other transmissions from the gNB which considered that those resources had been allocated for the downlink.

Example embodiments address this technical problem by providing additional information from which a slot format can be determined based on the additional information provided with an UL grant scheduling the URLLC PUSCH. This additional information may be combined with the semi-statically configured slot format to determine that F-symbols are designated for UL transmission. This recognizes that the PDCCH carrying the SFI may not meet the high reliability requirement of URLLC service and so this invention uses reliably determined information e.g. based on RRC Configuration or UL Grant for URLLC, to explicitly or implicitly update the slot format, especially the status of the F-symbols.

Explicit Indicator

According to example embodiments, an explicit slot format indication field is introduced in the UL grant that schedules PUSCH. Such embodiments utilizing an explicit configuration of the F-symbols are most applicable to dynamic UL grants such as those which utilize a DCI message M406. That is the DCI message M406 is adapted to include a field which provides an explicit slot formation indication, which can be one of:

Repeat of the slot format combination that is indicated in the SFI. Here the UL Grant need only provide the slot format that is relevant to the scheduled PUSCH, e.g. the Bandwidth Part, Serving Cell ID.

A Slot Format Combination ID (i.e. select a slot format from the SFI's Slot Format Combination list) that can be different to what is indicated in the SFI A slot format that is selected from one of the 255 possible slot format combinations (i.e. an index to the Slot Format lookup table in Section 11.1.1 of [7]) that can be different to that indicated by the SFI.

A bitmap indicating which F-symbols are UL-symbol and which are DL-symbol

A single bit indicating whether to treat ALL F-symbols as UL-symbols or DL-symbols A single bit indicating whether or not the scheduled PUSCH can be transmitted on F-symbols.

When the scheduled PUSCH cannot be transmitted on F-symbols and when at least one of the scheduled symbols for the PUSCH is overlapped with the F-symbols, UE drops the overlapped PUSCH with the F-symbols or all scheduled PUSCHs. Another alternative is that PUSCH is segmented, i.e. assuming the F-symbols are DL symbols.

A single bit indicating whether or not one of an implicit determination schemes is being used based on other information provided to the UE, for example as explained below.

It will be appreciated by those familiar with this technical field that although the UL grant can implicitly assign an UL-symbol by scheduling a PUSCH to occupy an F-symbol, the UL grant cannot turn an OFDM symbol indicated as DL-symbol by the SFI, into an UL-symbol. That is the SFI may assign an F-symbol as DL-symbol but the UL grant cannot then assign that symbol for PUSCH transmission. As described, the SFI does not have the required reliability and hence the UE may not be aware that an F-symbol has been configured as DL-symbol by the SFI. Hence, the UE could wrongly transmit a PUSCH in a DL-symbol causing interference. According to the example embodiments this error can be avoided or reduced by explicitly transmitting the slot format in the DCI in the UL grant. In addition to maintain the reliability of the slot format configuration, the indication in the UL Grant can provide flexibility of configuring the F-symbols thereby also maintaining the benefit of the SFI.

According to another embodiment, a UE dedicated RRC signaling can semi-statically configure some or all the F-symbols to be UL-symbols or DL-symbols or these can be reserved symbols that cannot be used by that UE. For example, this can be a simple one bit indicator or a bitmap indicating individual F-symbols.

Implicit Determination from a Number of PUSCH Repetitions

According to some example embodiments, the determination of the slot format, which identifies whether the F-symbols are for UL or DL transmissions, can be based on reliably determined information such as implicit information from the UL grant and/or RRC configured slot format. For some example embodiments, information provided with the configured grant of the UL resources, which can be provided by RRC signaling for example and perhaps persists for several sub-frames, can be used to provide an implicit indication of the designation of F-symbols as UL-symbols or DL-symbols. In other example embodiments, information provided with the UL-grant, which may be a dynamic grant of UL resources, can be used to provide an implicit indication of the designation of the F-symbols as UL-symbols or DL-symbols.

In one example the implicit indication of the slot format identifying whether F-symbols can be used for UL transmissions is determined by the UE from a number of repetitions of the UL data in the PUSCH. According to this example, the UL grant indicates the number of mini-slot repetitions R, for the scheduled PUSCH. As will be appreciated, this example embodiment is also applicable if the number of mini-slot repetitions is semi-statically configured by RRC, because the UE can determine the slot format implicitly from the number of repetitions indicted by the gNB. Some examples of how the UE can determine the slot format are:

If the number of repetitions is smaller than a threshold $R_{Short}$, i.e. $R<R_{Short}$, then all F-symbols are treated as UL-symbols. Although this may restrict the flexibility in configuring F-symbols, such restriction is only for a short duration, i.e. within $R_{Short}$ repetitions.

If the number of repetitions is greater than a threshold $R_{Long}$, i.e. $R>R_{Long}$, then all F-symbols are treated as UL-symbols. The benefit of this is that long repetitions require more resources and so the gNB may want to allocate the F-symbols for the PUSCH. However $R_{Long}$ and $R_{Short}$ need not be the same nor do they both need to be configured or implemented together (i.e. they can be individually configured or implemented). For an example in which $R_{Long} > R_{Short}$ then there is a window of repetitions, i.e. $R_{UL} < R < R_{DL}$, where F-symbols are treated as DL-symbols.

If the total length of the PUSCH, for example the duration of the PUSCH L×PUSCH repetition R, is less than a threshold $T_{Short}$, i.e. $L \times R < T_{Short}$, then all F-symbols are treated as UL-symbols. However the length of each PUSCH can be different, for example due to segmentation. L here can refer to the scheduled length in the DCI or the particular length of the PUSCH colliding with the F-symbols.

If the total length of the PUSCH is longer than a threshold, i.e. $L \times R > T_{Long}$, then all F-symbols are treated as UL-symbols. However, again the length of each PUSCH can be different, due to segmentation for example. L here can refer to the scheduled length in the DCI or the particular length of the PUSCH colliding with the F-symbols.

Figure 11:
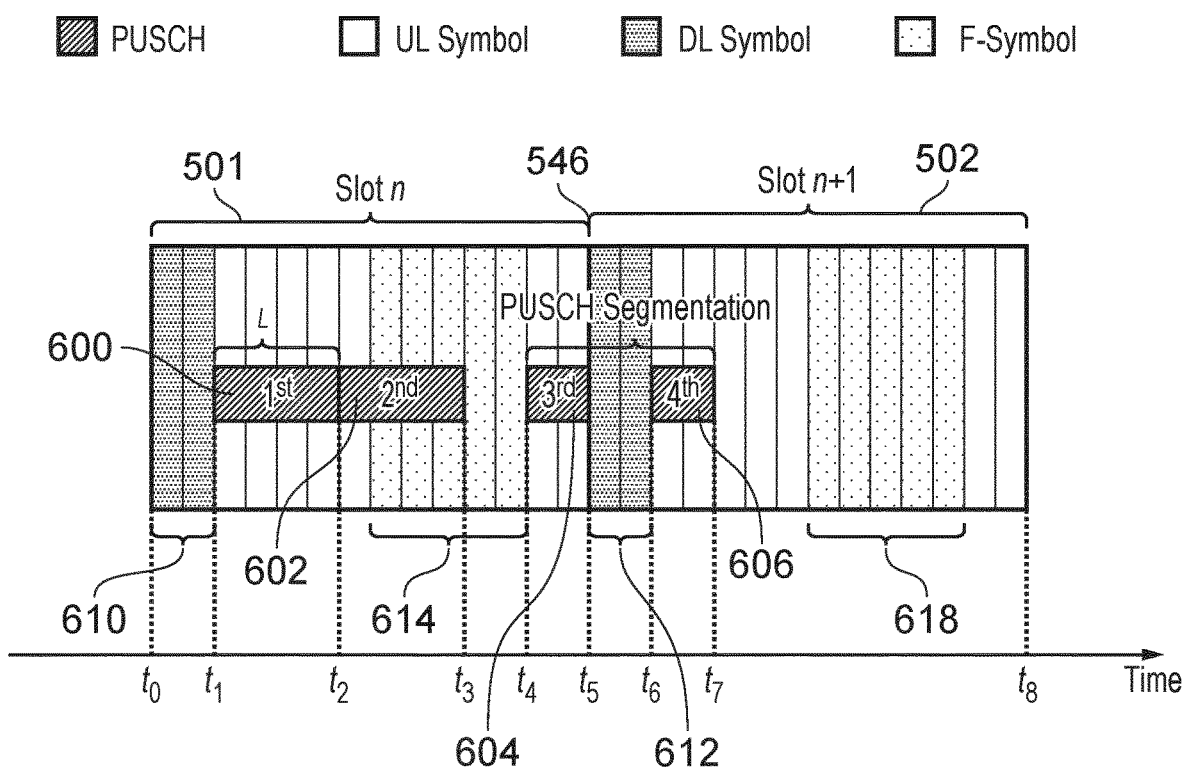
FIG. 11 is a schematic representation of two time slots corresponding to those shown in FIG. 5 illustrating an example transmission of uplink data using repetition in which one of the repetitions of the transmitted uplink data uses F-symbols which have been determined as being designated for uplink transmissions and one of the repetitions of the uplink data is segmented to prevent transmission of the uplink data in DL-symbols designated for downlink transmissions in accordance with an example embodiment.

For the first $M_{Early}$ repetitions, the F-symbols are treated as UL-symbols and for the remaining repetitions the F-symbols are treated as DL-symbols or reserved symbols (i.e. cannot be used by that UE). This example ensures that $M_{Early}$ repetitions are transmitted as soon as possible by allocating all F-symbols as UL resources for the UE. An example is shown in FIG. 11, in which the slot format is RRC configured to be {D, D, U, U, U, U, U, F, F, F, F, F, U, U} and here an UL grant schedules a PUSCH transmission 600 with L=4 symbols and R=3, which results in the UL transmissions 602, 604, 606. As shown in FIG. 11, the slot format indicator identifies two groups of two OFDM symbols for DL transmissions and two groups of F-symbols 614, 618 each comprising five symbols. For this example, $M_{Early}=2$, that is for the first two PUSCH repetitions 600, 602 the UE treats the F-symbols 614 indicated by the RRC configuration as UL-symbols and the remaining repetition 604, 606, the F-symbols are treated as DL-symbols. As shown, during the second repetition 602, the F-symbols 620 are treated as UL-symbols and then the remaining F-symbols 622 are treated as D-symbols, so that the transmission of the last repetition 604, 606 cannot begin until $t_4$. As will be appreciated therefore, the first PUSCH repetition 600 starts at time $t_1$ and does not collide with any F-symbols, because the next four symbols are identified in the RRC signaling as designated UL-symbols. The second PUSCH repetition 602 collides with F-symbols but since it is within $M_{Early}=2$, meaning that this is within two repetitions, the UE treats the F-symbols 620 as UL-symbols. However, the third repetition 604, 606 which would have started at time $t_3$ is postponed to the next available UL-symbols at time $t_4$, since it cannot be transmitted in F-symbols designated as D-symbols which are therefore can no longer be treated as UL-symbols. Since the third repetition crosses a slot boundary 546 and also crosses DL-symbols 612, the transmission of the UL data for this repetition is split between the third PUSCH transmission 604 and the fourth PUSCH transmission 606 which is transmitted in the next available UL-symbols at time $t_6$, after the slot boundary. Alternatively, the shortened PUSCH due to F-symbols or DL-symbols which produces the third and fourth transmission 604, 606 in this example can be implicitly dropped.

For PUSCH repetitions after $M_{Late}$, the F-symbols are treated as UL-symbols. This is similar to the example embodiment illustrated in FIG. 11, in which the first $M_{Early}$ repetitions treat F-symbols as UL-symbols, but here the later PUSCH repetitions can use the F-symbols for uplink transmission.

The parameters $R_{Short}$, $R_{Long}$, $T_{Short}$, $T_{Long}$, $M_{Early}$ and $M_{Late}$ can be RRC configured or defined in the specifications which predetermined these parameters. Some example embodiments may combine any of the above mentioned implicit techniques. Furthermore, the network can configure one or more of these parameters such that the UE always treats F-symbols as UL-symbols or always treat F-symbols as DL-symbols. For example, an implementation can be such that $M_{Early}$ is set to the maximum possible repetitions and so UE would always treat F-symbols as UL-symbols. On the other hand a configuration where $M_{Early}=0$ would always treat F-symbols as DL-symbols or reserved symbols that cannot be used.

Implicit Determination from a Number of F-Symbols

According to this example embodiment the implicit indication of the slot format is reliably determined from the RRC configured slot format, for example the number of contiguous F-symbols $N_F$.

According to one example embodiment, $N_C$ out of $N_F$ contiguous F-symbols are treated as UL-symbols. The contiguous F-symbols are determined based on an RRC configured slot format.

Figure 12:
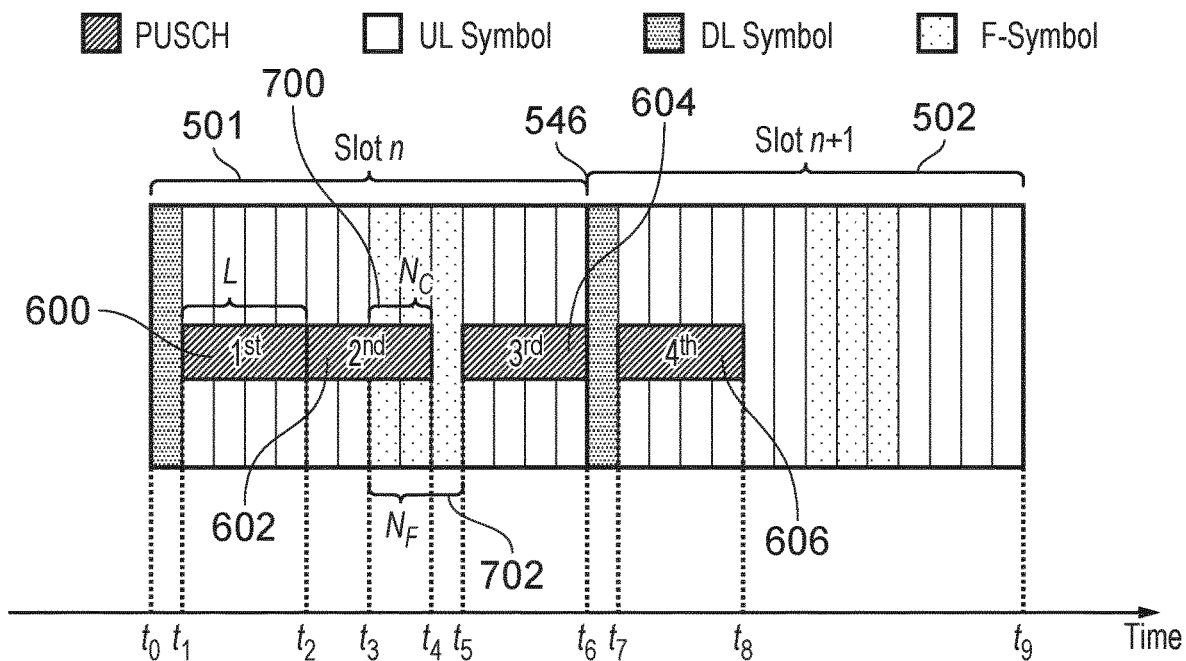
FIG. 12 is a schematic representation of two time slots corresponding to those shown in FIG. 5 illustrating an example transmission of uplink data using repetition in which one of the repetitions of the transmitted uplink data uses F-symbols which have been determined as being designated for uplink transmissions and others of the F-symbols cannot be used for transmitting uplink data in accordance with an example embodiment.

In another example, $N_C$=F-symbols colliding with a PUSCH transmission that starts prior of the contiguous F-symbols. This embodiment ensures that an ongoing PUSCH repetition is not segmented by F-symbols, although it can of course still be segmented by a DL-symbol. An example is shown in FIG. 12, in which the RRC configured slot format is {D, U, U, U, U, U, U, F, F, F, U, U, U, U} and here a PUSCH is scheduled with L=4 700 (PUSCH duration of 4 OFDM symbols) and R=4 (4× repetitions) resulting in three other transmissions 602, 604, 606. The second PUSCH transmission 602 starting at time $t_2$, collides with $N_F=3$ contiguous F-symbols 702 between time $t_3$ and $t_4$, so that $N_C=2$ symbols are designated as UL-symbols 700. As per this example embodiment, the colliding $N_C=2$ contiguous F-symbols 700 are treated as UL-symbols so that the second PUSCH 602 is not segmented. The third PUSCH transmission 604 can then start only after these contiguous F-symbols 702 at time $t_5$, leaving a gap of one OFDM symbol 704 between the second PUSCH transmission 602 and the third PUSCH transmission 604. In this example, the treatment of the contiguous F-symbols 700 as UL-symbols therefore avoided segmenting the second PUSCH transmission 602.

Figure 13:
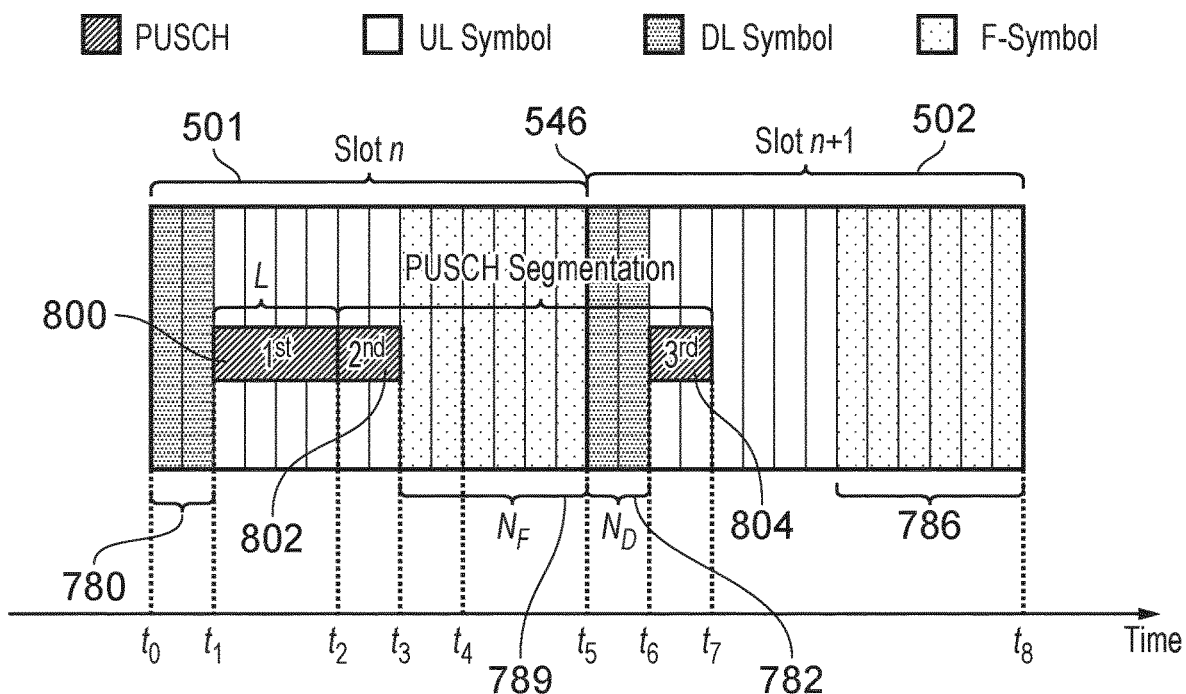
FIG. 13 is a schematic representation of two time slots corresponding to those shown in FIG. 5 illustrating an example transmission of uplink data using repetition in which one of the repetitions of the transmitted uplink data is segmented in order to avoid transmitting the uplink data in F-symbols which have been determined as being designated for downlink transmissions in accordance with an example embodiment.
Figure 14:
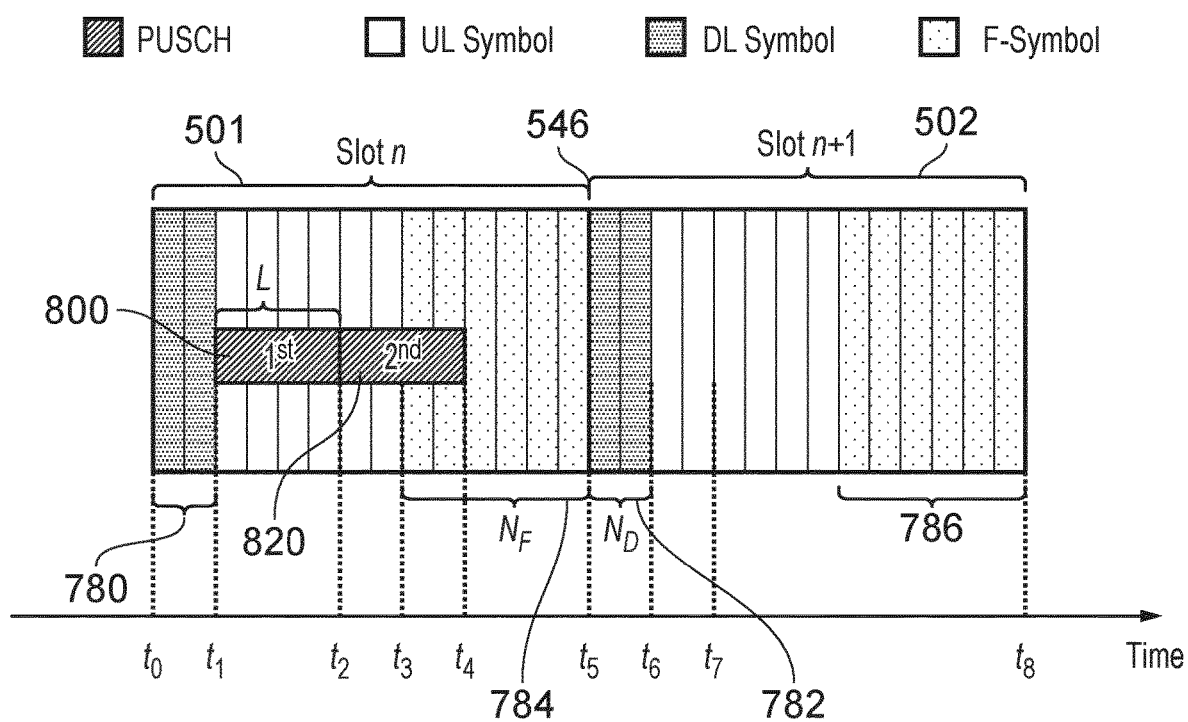
FIG. 14 is a schematic representation of two time slots corresponding to those shown in FIG. 5 illustrating an example transmission of uplink data using repetition in which one of the repetitions of the transmitted uplink data uses F-symbols which have been determined as being designated for uplink transmissions in order to avoid a length of the transmission of the uplink data exceeding a predetermined threshold in accordance with an example embodiment.

According to another example embodiment, the implicit indication of the slot format is determined by the UE from a number of contiguous potential invalid symbols $N_I$ encountered by a PUSCH repetition. Invalid symbols are symbols that the UE cannot use for uplink transmissions, which is a number of contiguous potential invalid symbols being the number of contiguous F-symbols $N_F$, and DL-symbols $N_D$, that is $N_I = N_F + N_D$. These symbols are based on the RRC configured slot format, and hence is reliable to the UE. The word "potential" is used because the F-symbol is invalid only if it remains as F-symbol or DL-symbol but would not be invalid if it is treated as an UL-symbol. Some examples forming example embodiments are:

If $N_I>N_{Long}$, where $N_{Long}$ is a predefined threshold established for example using RRC signalling or is defined in the specifications, then the F-symbols are treated as UL-symbols. According to this example, if the potential invalid symbols are too long, segmentation of a PUSCH transmission would lead to an unacceptable latency that may not meet the URLLC requirement. An example is shown in FIG. 13, in which the RRC configured slot format is {D, D, U, U, U, U, U, U, F, F, F, F, F, F}, providing two groups of DL-symbols 780, 782 and two groups of six F-symbols 784, 786. In this example, a PUSCH transmission is scheduled with L=4 (four symbols duration) and R=2 (2× repetitions) resulting in a first PUSCH transmission 800 and second and third PUSCH transmissions 802, 804, where the second the third transmissions 802, 804 result from the second repetition. This is because the second repetition collides with the first group of F-symbols 784 where the contiguous number of F-symbols $N_F=6$ and DL-symbols $N_D=2$, leads to $N_I=8$. If the second PUSCH repetition which starts at time $t_2$ is segmented, it would lead to two PUSCH transmissions 802, 804 being transmitted, with the third PUSCH transmission 804 starting at time $t_5$ and ending at time $t_7$. That is the segmentation due to $N_I$ invalid symbols leads to the overall PUSCH transmissions to be delayed and so if $N_I$ is too large this delay would lead to the UE not meeting the URRLC latency requirement. FIG. 14 is an example which corresponds to the example of FIG. 13, where $N_{Long}=4$ OFDM symbols. Since $N_I=8$ OFDM symbols is greater than $N_{Long}$, the UE treats the F-symbols 784 as UL-symbols, which has avoided the second PUSCH repetition 820 from being segmented and hence delayed beyond an acceptable level. Here the PUSCH transmission ends at time $t_4$ instead of time $t_7$ if the PUSCH is segmented as it was in FIG. 13. In contrast, if $N_I<N_{Long}$ the F-symbols can be treated as invalid, and not used for PUSCH transmission. $N_{Long}$ can be viewed as the delay that the PUSCH transmission can tolerate.

If $N_I<N_{Short}$, the F-symbols are treated as UL-symbols, and so can be used to transmit PUSCH. This example has an advantage that flexibility in using the F-symbols is not significantly impacted if the duration of the F-symbols is small.

In another embodiment, the potential invalid symbols consists of only the contiguous F-symbols, that is, $N_I=N_F$.

It should be appreciated that the embodiments using $N_{Long}$ and $N_{Short}$ can be implemented separately or combined.

In another embodiment, the value of $N_{Long}$ and/or $N_{Short}$ is RRC configured or determined in the specifications.

In another embodiment, the value of $N_{Long}$ and/or $N_{Short}$ is dynamically indicated in the UL grant.

In another embodiment, the value of $N_{Long}$ is dynamically implicitly determined from the PUSCH attributes. For example, one such attribute is a single PUSCH duration L, i.e. $N_{Long}=L$, and hence if PUSCH segmentation leads to a delay that is greater than a duration of PUSCH, then treat the F-symbols as UL-symbols. This ensure that the overall PUSCH transmission is not delayed beyond a PUSCH duration.

The example embodiments described above can maintain the benefit of the SFI in configuring the F-symbols but also maintains the reliability of the slot format configuration by sending the slot format information in the UL grant scheduling the URLLC PUSCH.

Summary of Operation

Figure 15:
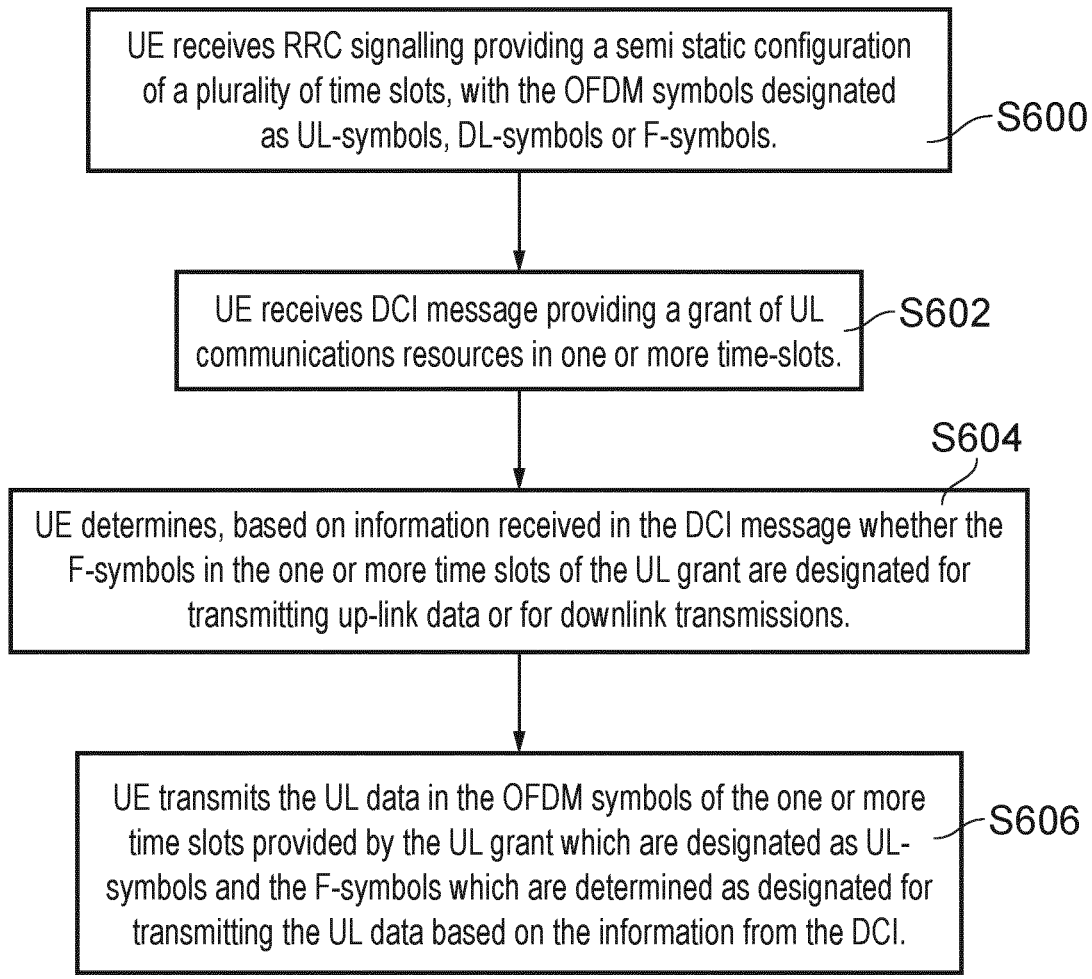
FIG. 15 is a flow diagram illustrating an example operation of a communications device in accordance with an example embodiment of the present technique.

FIG. 15 provides a flow diagram illustrating an example operation of a UE which is configured to transmit UL data in accordance with an example embodiment. The flow diagram of FIG. 15 is summarised as follows:

S600: A UE receives an indication of a configuration of a plurality of time-slots of a wireless access interface. As indicated above, each of the time-slots includes communications resources comprising a plurality of Orthogonal Frequency Division Multiplexed, OFDM, symbols, and for the example of 5G/NR shown in FIG. 4 each of the time-slots comprises fourteen OFDM symbols. The configuration of the time-slots designated by the received indication identify for each of the OFDM symbols, whether the OFDM symbol is an uplink symbol for the UE to transmit uplink data, a downlink symbol in which an infrastructure equipment can transmit signals and the UE cannot transmit the uplink data or a flexible symbol which can be configured by a slot format indicator as either designated as uplink symbols or downlink symbols.

S602: The UE receives a DCI message providing an uplink grant of PUSCH communications resources in one or more of the time-slots of the wireless access interface for transmitting data. As explained above, typically the DCI message provides an indication of a number of repetitions of the UL data are to be transmitted in the PUSCH resources and a number of OFDM symbols which are to be used for each repetition (transport block or data unit). It is therefore likely that one or more of the repetitions of the UL data will fall within a contiguous section of OFDM symbols of the PUSCH which includes a symbol which has been designated as a flexible symbol (F-symbol).

S604: The UE then determines from the granted communications resources, OFDM symbols of the one or more time slots which are designated by the gNB for transmitting uplink data, which may be OFDM symbols preconfigured for UL transmission (UL-symbols) or flexible symbols (F-symbols) which are designated to be used for UL transmission. The UE determines the OFDM symbols of the one or more time slots which are designated for UL transmission by identifying one or more of the F-symbols of the one or more time slots which can be used for transmitting the UL data based on information received in the DCI message granting the communications resources of the uplink.

S606: The UE transmits the uplink data in the OFDM symbols determined as designated for UL transmission.

Corresponding communications devices, infrastructure equipment and methods therefore, and circuitry for a communications device and circuitry for infrastructure equipment have also been described.

It will be appreciated that while the present disclosure has in some respects focused on implementations in an LTE-based and/or 5G network for the sake of providing specific examples, the same principles can be applied to other wireless telecommunications systems. Thus, even though the terminology used herein is generally the same or similar to that of the LTE and 5G standards, the teachings are not limited to the present versions of LTE and 5G and could apply equally to any appropriate arrangement not based on LTE or 5G and/or compliant with any other future version of an LTE, 5G or other standard.

It may be noted various example approaches discussed herein may rely on information which is predetermined/predefined in the sense of being known by both the base station and the communications device. It will be appreciated such predetermined/predefined information may in general be established, for example, by definition in an operating standard for the wireless telecommunication system, or in previously exchanged signalling between the base station and communications devices, for example in system information signalling, or in association with radio resource control setup signalling, or in information stored in a SIM application. That is to say, the specific manner in which the relevant predefined information is established and shared between the various elements of the wireless telecommunications system is not of primary significance to the principles of operation described herein. It may further be noted various example approaches discussed herein rely on information which is exchanged/communicated between various elements of the wireless telecommunications system and it will be appreciated such communications may in general be made in accordance with conventional techniques, for example in terms of specific signalling protocols and the type of communication channel used, unless the context demands otherwise. That is to say, the specific manner in which the relevant information is exchanged between the various elements of the wireless telecommunications system is not of primary significance to the principles of operation described herein.

It will be appreciated that the principles described herein are not applicable only to certain types of communications device, but can be applied more generally in respect of any types of communications device, for example the approaches are not limited to machine type communication devices/IoT devices or other narrowband communications devices, but can be applied more generally, for example in respect of any type of communications device operating with a wireless link to the communication network.

It will further be appreciated that the principles described herein are not applicable only to LTE-based wireless telecommunications systems, but are applicable for any type of wireless telecommunications system that supports a dynamic scheduling of shared communications resources.

Further particular and preferred aspects of the present invention are set out in the accompanying independent and dependent claims. It will be appreciated that features of the dependent claims may be combined with features of the independent claims in combinations other than those explicitly set out in the claims.

Thus, the foregoing discussion discloses and describes merely exemplary embodiments of the present invention. As will be understood by those skilled in the art, the present invention may be embodied in other specific forms without departing from the spirit or essential characteristics thereof. Accordingly, the disclosure of the present invention is intended to be illustrative, but not limiting of the scope of the invention, as well as other claims. The disclosure, including any readily discernible variants of the teachings herein, define, in part, the scope of the foregoing claim terminology such that no inventive subject matter is dedicated to the public.

Respective features of the present disclosure are defined by the following numbered paragraphs:

Paragraph 1. A method of transmitting data by a communications device to a wireless communications network, the method comprising receiving by the communications device an indication of communications resources in one or more of the time-slots of a wireless access interface provided by the wireless communications network for transmitting the uplink data, the time-slots each including communications resources comprising a plurality of Orthogonal Frequency Division Multiplexing, OFDM, symbols designated as either uplink symbols for the communications device to transmit uplink data, downlink symbols in which an infrastructure equipment can transmit signals and the communications device cannot transmit the uplink data or flexible symbols which can be configured as either designated as uplink symbols or downlink symbols, determining, by the communications device, from the indication of the communications resources, OFDM symbols of the one or more time-slots which are designated for transmitting the uplink data, and transmitting the uplink data in the OFDM symbols determined as designated for uplink transmission, wherein the determining the OFDM symbols of the one or more time slots which are designated for transmitting uplink data includes identifying one or more of the flexible symbols of the one or more time-slots which can be used for transmitting the uplink data based on information received in the indication of the communications resources for transmitting the uplink data.

Paragraph 2. The method of transmitting according to paragraph 1, wherein the indication of the communications resources received by the communications device for transmitting the uplink data is one of a configured grant of semi-statically configured resources or a dynamic grant of communications resources provided by a downlink control information message providing an uplink grant.

Paragraph 3. The method of transmitting according to paragraph 2, wherein the indication of the communications resources for transmitting the uplink data is provided by a downlink control information message providing a dynamic grant of communication resources in the uplink for the communications device to transmit the uplink data, and the identifying the one or more of the flexible symbols of the one or more time-slots which can be used for transmitting the uplink data is based on information received in the downlink control message, the information including an explicit indication of the one or more flexible symbols which are designated as uplink symbols.

Paragraph 4. The method of transmitting according to paragraph 3, wherein the information received in the downlink control message granting the communications resources of the uplink includes a slot format combination identifier providing an explicit indication of the one or more flexible symbols which are designated as uplink symbols.

Paragraph 5. The method of transmitting according to paragraph 3, wherein the information received in the downlink control message granting the communications resources of the uplink comprises a bitmap indicating which of the flexible symbols are designated as uplink symbols and which are designated as downlink symbols.

Paragraph 6. The method of transmitting according to paragraph 3, wherein the information received in the downlink control message granting the communications resources of the uplink comprises a bit indicating that all of the flexible symbols of the one or more time-slots are designated as uplink symbols or downlink symbols.

Paragraph 7. The method of transmitting according to paragraph 3, wherein the information received in the downlink control message granting the communications resources of the uplink comprises a bit indicating whether or not any of the flexible symbols of the one or more time-slots of the granted communications resources of the uplink can be used as uplink symbols or downlink symbols.

Paragraph 8. The method of transmitting according to paragraph 7, comprising not transmitting the uplink data in the granted communications resources if the information bit indicates that the flexible symbols cannot be used for uplink transmission.

Paragraph 9. The method of transmitting according to paragraph 3, wherein the information received in the downlink control message granting the communications resources of the uplink comprises a bit indicating that the communications device can infer that one or more of the flexible symbols are designated as uplink symbols implicitly from communications parameters provided with the uplink grant.

Paragraph 10. The method of transmitting according to paragraph 3, wherein the downlink control information message providing the uplink grant of communications resources for transmitting the uplink data includes one or more communications parameters for transmitting the uplink data, and the determining the OFDM symbols of the one or more time slots which are designated for transmitting uplink data comprises determining whether one or more of the flexible symbols are designated for transmitting the uplink data implicitly from the one or more communications parameters.

Paragraph 11. The method of transmitting according to paragraph 1 or 2, wherein the indication of the communications resources received by the communications device for transmitting the uplink data is provided as a configured grant, the configured grant including one or more communications parameters for transmitting the uplink data, and the determining the OFDM symbols of the one or more time slots which are designated for transmitting uplink data comprises determining whether one or more of the flexible symbols are designated for transmitting the uplink data implicitly from the one or more communications parameters.

Paragraph 12. The method of transmitting according to paragraph 10 or 11, wherein the one or more communications parameters includes an indication of a number of repetitions that the uplink data is to be transmitted in the granted uplink communications resources, and the determining whether one or more of the flexible symbols are designated for transmitting the uplink data comprises comparing the number of repetitions with a predetermined threshold and determining whether the one or more of the flexible symbols are designated for transmitting the uplink data based on the comparison.

Paragraph 13. The method of transmitting according to paragraph 12, wherein the threshold is a first long threshold and the determining whether the one or more of the flexible symbols are designated for transmitting the uplink data in response to the comparison comprises determining that the one or more flexible symbols are designated for transmitting the uplink data if the number of repetitions is greater than the long threshold.

Paragraph 14. The method of transmitting according to paragraph 12, wherein the threshold is a second short threshold and the determining whether the one or more of the flexible symbols are designated for transmitting the uplink data in response to the comparison comprises determining that the one or more flexible symbols are designated for transmitting the uplink data if the number of repetitions is less than the second short threshold.

Paragraph 15. The method of transmitting according to paragraph 10 or 11, wherein the one or more communications parameters includes an indication of a number of one or more repetitions that the uplink data is to be transmitted in the granted uplink communications resources and an indication of the number of the OFDM symbols which are to be used for each transmission of the uplink data, and the determining whether one or more of the flexible symbols are designated for transmitting the uplink data comprises determining a total length of time for transmitting all of the repetitions based on the length of each transmission in the one or more time slots of the granted uplink communications resources and comparing the total length of time with a length threshold and determining whether the one or more of the flexible symbols are designated for transmitting the uplink data based on the comparison.

Paragraph 16. The method of transmitting according to paragraph 15, wherein the length of time for transmitting the uplink data is a total formed by multiplying the number of repetitions with the number of OFDM symbols for each transmission.

Paragraph 17. The method of transmitting according to paragraph 15, wherein the length of time for transmitting the uplink data is a time between a first OFDM symbol of a first transmission and a last OFDM symbol of a last repetition including splitting a repetition to form a plurality of segments to avoid down-link symbols, flexible symbols or a boundary between time slots.

Paragraph 18. The method of transmitting according to paragraph 10 or 11, wherein the one or more communications parameters includes an indication of a number of one or more repetitions that the uplink data is to be transmitted in the granted uplink communications resources, and the determining whether one or more of the flexible symbols are designated for transmitting the uplink data comprises determining whether there are any flexible symbols present in the one or more time slots when transmitting a threshold number M of the one or more repetitions first transmitted, and determining that the flexible symbols within the threshold number of repetitions are designated for transmitting the uplink data and the remaining repetitions after the threshold number are not designated for transmitting the uplink data.

Paragraph 19. The method of transmitting according to paragraph 10 or 11, wherein the one or more communications parameters includes an indication of a number of one or more repetitions that the uplink data is to be transmitted in the granted uplink communications resources, and the determining whether one or more of the flexible symbols are designated for transmitting the uplink data comprises determining whether there are any flexible symbols present in the one or more time slots after transmitting a threshold number of the one or more repetitions, and determining that the flexible symbols within the remaining repetitions after the threshold number are designated for transmitting the uplink data and the one or more repetitions before the threshold number are not designated for transmitting uplink data.

Paragraph 20. The method of transmitting according to any of paragraphs 1 to 17, comprising receiving an indication of a configuration of a plurality of time-slots of a wireless access interface, the time-slots each including communications resources comprising a plurality of Orthogonal Frequency Division Multiplexed, OFDM, symbols and the configuration of the time-slots designates each of the OFDM symbols as either uplink symbols for the communications device to transmit uplink data, downlink symbols in which an infrastructure equipment can transmit signals and the communications device cannot transmit the uplink data or flexible symbols which can be configured by a slot format indicator as either designated as uplink symbols or downlink symbols.

Paragraph 21. The method of transmitting according to paragraph 18, wherein the receiving the indication of the configuration of the plurality of time-slots of a wireless access interface comprises receiving the configuration using radio resource configuration signalling.

Paragraph 22. The method of transmitting according to paragraph 10 or 11, wherein the one or more communications parameters includes an indication of a number of repetitions that the uplink data is to be transmitted one or more times in the granted uplink communications resources and an indication of the number of the OFDM symbols which are to be used for each transmission of the uplink data, and the determining whether one or more of the flexible symbols are designated for transmitting the uplink data comprises determining a number of contiguous potential invalid symbols in the one or more time slots comprising one or both of a number of one or more contiguous flexible symbols, and a number of one or more downlink symbols, and determining whether one or more of the flexible symbols are designated for transmitting the uplink data based on a comparison between the number of the contiguous potential invalid symbols and a threshold value.

Paragraph 23. The method of transmitting according to paragraph 22, wherein the determining whether one or more of the flexible symbols are designated for transmitting the uplink data based on a comparison between the number of the contiguous potential invalid symbols and a threshold value comprises determining that the flexible symbols are designated as uplink symbols if the number of the contiguous potential invalid symbols is greater than a threshold value.

Paragraph 24. The method of transmitting according to paragraph 22, wherein the determining whether one or more of the flexible symbols are designated for transmitting the uplink data based on a comparison between the number of the contiguous potential invalid symbols and a threshold value comprises determining that the flexible symbols are designated as uplink symbols if the number of the contiguous potential invalid symbols is less than a threshold value.

Paragraph 25. The method of transmitting according to paragraph 23 or 24, comprising identifying whether a transmission of one of the repetitions would overlap the number of contiguous potential invalid symbols, and determining that the flexible symbols are designated as uplink symbols if the contiguous potential invalid symbols overlaps with one of the repetitions based on the comparison with the threshold.

Paragraph 26. The method of transmitting according to paragraph 10 or 11, wherein the one or more communications parameters includes an indication of a number of repetitions that the uplink data is to be transmitted one or more times in the uplink communications resources and an indication of the number of the OFDM symbols which are to be used for each transmission of the uplink data, and the determining whether one or more of the flexible symbols are designated for transmitting the uplink data comprises determining that one or more of the repetitions of the uplink data would be required to be segmented into different segments of contiguous OFDM symbols, the segments of the repetition of the uplink transmission being separated, to avoid transmitting in one or more flexible symbols, transmissions, and determining that the one or more of the flexible symbols are designated for transmitting the uplink data to avoid the one or more repetitions of the uplink data being segmented.

Paragraph 27. A communications device configured to transmit uplink data to a wireless communications network, the communications device comprising transmitter circuitry configured to transmit signals representing the uplink data via a wireless access interface provided by the wireless communications network, receiver circuitry configured to receive signals from the wireless access interface, and controller circuitry configured to control the transmitter circuitry and the receiver circuitry to receiving an indication of communications resources in one or more of the time-slots of a wireless access interface provided by the wireless communications network for transmitting the uplink data, the time-slots each including communications resources comprising a plurality of Orthogonal Frequency Division Multiplexing, OFDM, symbols designated as either uplink symbols for the communications device to transmit uplink data, downlink symbols in which an infrastructure equipment can transmit signals and the communications device cannot transmit the uplink data or flexible symbols which can be configured as either designated as uplink symbols or downlink symbols, to determine from the indication of the communications resources, OFDM symbols of the one or more time-slots which are designated for transmitting the uplink data, and to transmit the uplink data in the OFDM symbols determined as designated for uplink transmission, wherein the determining the OFDM symbols of the one or more time slots which are designated for transmitting uplink data includes identifying one or more of the flexible symbols of the one or more time-slots which can be used for transmitting the uplink data based on information received in the indication of the communications resources for transmitting the uplink data.

Paragraph 28. A method of operating an infrastructure equipment of a wireless communications network to receive uplink data from a communications device, the method comprising transmitting to the communications device an indication of communications resources in one or more of the time-slots of a wireless access interface provided by the wireless communications network for the communications device to transmit the uplink data, the time-slots each including communications resources comprising a plurality of Orthogonal Frequency Division Multiplexing, OFDM, symbols designated as either uplink symbols for the communications device to transmit uplink data, downlink symbols in which an infrastructure equipment can transmit signals and the communications device cannot transmit the uplink data or flexible symbols which can be configured as either designated as uplink symbols or downlink symbols, and receiving the uplink data in the OFDM symbols determined as designated for uplink transmission, wherein one or more of the flexible symbols of the one or more time-slots are indicated as being for use for transmitting the uplink data in the transmitted indication of the communications resources for transmitting the uplink data.

Paragraph 29. An infrastructure equipment of a wireless communications network for receiving uplink data from a communications device, the infrastructure equipment comprising receiver circuitry configured to receive signals representing the uplink data transmitted via a wireless access interface provided by the wireless communications network, transmitter circuitry configured to transmit signals via the wireless access interface, and controller circuitry configured to control the transmitter circuitry and the receiver circuitry to transmit to the communications device an indication of communications resources in one or more of the time-slots of a wireless access interface provided by the wireless communications network for the communications device to transmit the uplink data, the time-slots each including communications resources comprising a plurality of Orthogonal Frequency Division Multiplexing, OFDM, symbols designated as either uplink symbols for the communications device to transmit uplink data, downlink symbols in which an infrastructure equipment can transmit signals and the communications device cannot transmit the uplink data or flexible symbols which can be configured as either designated as uplink symbols or downlink symbols, and to receive the uplink data in the OFDM symbols determined as designated for uplink transmission, wherein one or more of the flexible symbols of the one or more time-slots are indicated as being for use for transmitting the uplink data in the transmitted indication of the communications resources for transmitting the uplink data.

Further particular and preferred aspects of the present invention are set out in the accompanying independent and dependent claims. It will be appreciated that features of the dependent claims may be combined with features of the independent claims in combinations other than those explicitly set out in the claims.

REFERENCES

[1] RP-182090, "Revised SID: Study on NR Industrial Internet of Things (IoT)," 3GPP RAN #81.
[2] Holma H. and Toskala A, "LTE for UMTS OFDMA and SC-FDMA based radio access", John Wiley and Sons, 2009
[3] RP-190726, "Physical layer enhancements for NR ultra-reliable and low latency communication (UR LLC)," Huawei, HiSilicon, RAN #83
[4] R1-1906057, "PDCCH enhancements for URLLC," Huawei, HiSilicon, RAN1 #97
[5] R1-1906751, "On PDCCH enhancements for NR URLLC," Nokia, Nokia Shanghai Bell, RAN1 #97
[6] T538.212, "Multiplexing and channel coding (Release 15)"
[7] T538.213, "Physical layer procedures for control"
[8] R1-1907221, "PUSCH enhancements for NR URLLC," Sharp, RAN1 #97
[9] R1-1906808, "On PUSCH enhancements for eURLLC," Intel Corporation, RAN1 #97

What is claimed is:

1. A method of transmitting data by a communications device to a wireless communications network, the method comprising:
receiving by the communications device an uplink grant including an indication of communications resources in one or more time-slots of a wireless access interface provided by the wireless communications network for transmitting uplink data, the one or more time-slots each including communications resources comprising a plurality of Orthogonal Frequency Division Multiplexing (OFDM) symbols designated as uplink symbols for the communications device to transmit the uplink data, downlink symbols in which an infrastructure equipment transmits signals and the communications device does not transmit the uplink data or flexible symbols which are configurable as either designated as corresponding to the uplink symbols or corresponding to the downlink symbols,
determining, by the communications device, from the indication of the communications resources, OFDM symbols of the one or more time-slots which are designated for transmitting the uplink data, and
transmitting the uplink data in the OFDM symbols determined as designated for uplink transmission,
wherein the determining the OFDM symbols of the one or more time slots which are designated for transmitting uplink data includes identifying one or more of the flexible symbols of the one or more time-slots which are usable for transmitting the uplink data based on information received in the indication of the communications resources for transmitting the uplink data, the information including an explicit indicator indicating the one or more flexible symbols of the one or more time-slots which are usable for transmitting the uplink data, the explicit indicator being in addition to a slot format indicator (SFI).

2. The method of transmitting according to claim 1, wherein the indication of the communications resources received by the communications device for transmitting the uplink data is one of a configured grant of semi-statically configured resources or a dynamic grant of communications resources provided by a downlink control information message providing the uplink grant.

3. The method of transmitting according to claim 2, wherein the uplink grant includes a downlink control information message providing a dynamic grant of communications resources in the uplink for the communications device to transmit the uplink data, and the identifying the one or more of the flexible symbols of the one or more time-slots which are usable for transmitting the uplink data is based on information received in the downlink control message.

4. The method of transmitting according to claim 3, wherein the information received in the downlink control information message granting the communications resources of the uplink includes a slot format combination identifier providing an explicit indication of the one or more flexible symbols which are designated as uplink symbols.

5. The method of transmitting according to claim 3, wherein the information received in the downlink control information message granting the communications resources of the uplink comprises a bitmap indicating which of the flexible symbols are designated as uplink symbols and which are designated as downlink symbols.

6. The method of transmitting according to claim 3, wherein the information received in the downlink control information message granting the communications resources of the uplink comprises a bit indicating that all of the flexible symbols of the one or more time-slots are designated as uplink symbols or downlink symbols.

7. The method of transmitting according to claim 3, wherein the information received in the downlink control information message granting the communications resources of the uplink comprises a bit indicating whether or not any of the flexible symbols of the one or more time-slots of the granted communications resources of the uplink that are usable as uplink symbols or downlink symbols.

8. The method of transmitting according to claim 7, comprising not transmitting the uplink data in the granted communications resources if the information bit indicates that the flexible symbols is not usable for uplink transmission.

9. The method of transmitting according to claim 3, wherein the information received in the downlink control information message granting the communications resources of the uplink comprises a bit indicating that implicitly indicates to the communications device that one or more of the flexible symbols are designated as uplink symbols implicitly from communications parameters provided with the uplink grant.

10. The method of transmitting according to claim 3, wherein the downlink control information message providing the uplink grant of communications resources for transmitting the uplink data includes one or more communications parameters for transmitting the uplink data, and the determining the OFDM symbols of the one or more time slots which are designated for transmitting uplink data comprises determining whether one or more of the flexible symbols are designated for transmitting the uplink data implicitly from the one or more communications parameters.

11. The method of transmitting according to claim 10, wherein the one or more communications parameters includes an indication of a number of repetitions that the uplink data is to be transmitted in the granted uplink communications resources, and the determining whether one or more of the flexible symbols are designated for transmitting the uplink data comprises comparing the number of repetitions with a predetermined threshold and determining whether the one or more of the flexible symbols are designated for transmitting the uplink data based on the comparison.

12. The method of transmitting according to claim 11, wherein the predetermined threshold is a first long threshold and the determining whether the one or more of the flexible symbols are designated for transmitting the uplink data in response to the comparison comprises determining that the one or more flexible symbols are designated for transmitting the uplink data if the number of repetitions is greater than the first long threshold.

13. The method of transmitting according to claim 11, wherein the predetermined threshold is a second short threshold and the determining whether the one or more of the flexible symbols are designated for transmitting the uplink data in response to the comparison comprises determining that the one or more flexible symbols are designated for transmitting the uplink data if the number of repetitions is less than the second short threshold.

14. The method of transmitting according to claim 10, wherein the one or more communications parameters includes an indication of a number of one or more repetitions that the uplink data is to be transmitted in the granted uplink communications resources and an indication of the number of the OFDM symbols which are to be used for each transmission of the uplink data, and the determining whether one or more of the flexible symbols are designated for transmitting the uplink data comprises determining a total length of time for transmitting all of the repetitions based on a length of each transmission in the one or more time slots of the granted uplink communications resources and comparing the total length of time with a length threshold and determining whether the one or more of the flexible symbols are designated for transmitting the uplink data based on the comparison.

15. The method of transmitting according to claim 14, wherein a length of time for transmitting the uplink data is a total formed by multiplying the number of repetitions with the number of OFDM symbols for each transmission.

16. The method of transmitting according to claim 14, wherein a length of time for transmitting the uplink data is a time between a first OFDM symbol of a first transmission and a last OFDM symbol of a last repetition including splitting a repetition to form a plurality of segments to avoid down-link symbols, flexible symbols or a boundary between time slots.

17. The method of transmitting according to claim 1, wherein the indication of the communications resources received by the communications device for transmitting the uplink data includes one or more communications parameters for transmitting the uplink data, and the determining the OFDM symbols of the one or more time slots which are designated for transmitting uplink data comprises determining whether one or more of the flexible symbols are designated for transmitting the uplink data implicitly from the one or more communications parameters.

18. The method of transmitting according to claim 1, wherein the uplink grant includes an indication of a configuration of a plurality of the one or more time-slots of the wireless access interface, the time-slots each including communications resources comprising a plurality of OFDM symbols and the configuration of the time-slots designates each of the OFDM symbols as either uplink symbols for the communications device to transmit uplink data, downlink symbols in which transmit signals are transmittable by an infrastructure equipment and uplink data is not transmittable by the communications device or flexible symbols which are configurable by a slot format indicator as either designated as uplink symbols or downlink symbols.

19. A communications device configured to transmit uplink data to a wireless communications network, the communications device comprising:
transmitter circuitry configured to transmit signals representing the uplink data via a wireless access interface provided by the wireless communications network,
receiver circuitry configured to receive signals from the wireless access interface, and
controller circuitry configured to control the transmitter circuitry and the receiver circuitry
to receive an uplink grant including an indication of communications resources in one or more time-slots of a wireless access interface provided by the wireless communications network for transmitting the uplink data, the time-slots each including communications resources comprising a plurality of Orthogonal Frequency Division Multiplexing (OFDM) symbols designated as uplink symbols for the communications device to transmit uplink data, downlink symbols in which an infrastructure equipment transmit signals and the communications device does not transmit the uplink data or flexible symbols which are configurable as either corresponding to the uplink symbols or corresponding to the downlink symbols,
to determine from the indication of the communications resources, OFDM symbols of the one or more of the time-slots which are designated for transmitting the uplink data, and
to transmit the uplink data in the OFDM symbols determined as designated for uplink transmission,
wherein the determining the OFDM symbols of the one or more of the time slots which are designated for transmitting uplink data includes identifying one or more of the flexible symbols of the one or more of the time-slots which are usable for transmitting the uplink data based on information received in the indication of the communications resources for transmitting the uplink data, the information including an explicit indicator indicating the one or more flexible symbols of the one or more time-slots which are usable for transmitting the uplink data, the explicit indicator being in addition to a slot format indicator (SFI).

20. A method of operating an infrastructure equipment of a wireless communications network to receive uplink data from a communications device, the method comprising:
transmitting to the communications device an uplink grant including an indication of communications resources in one or more time-slots of a wireless access interface provided by the wireless communications network for the communications device to transmit the uplink data, the time-slots each including communications resources comprising a plurality of Orthogonal Frequency Division Multiplexing (OFDM) symbols designated as uplink symbols for the communications device to transmit uplink data, downlink symbols in which an infrastructure equipment transmits signals and the communications device does not transmit the uplink data or flexible symbols which are configurable as either designated as uplink symbols or downlink symbols, and receiving the uplink data in the OFDM symbols determined as designated for uplink transmission, wherein one or more of the flexible symbols of the one or more of the time-slots are indicated as being for use for transmitting the uplink data in the transmitted indication of the communications resources for transmitting the uplink data, and the transmitted indication includes an explicit indicator indicating the one or more flexible symbols of the one or more time-slots as being used for transmitting the uplink data, the explicit indicator being in addition to a slot format indicator (SFI).

* * * * *